United States Patent
Rose et al.

(10) Patent No.: US 12,427,654 B2
(45) Date of Patent: *Sep. 30, 2025

(54) ROBOT SYSTEMS, METHODS, CONTROL MODULES, AND COMPUTER PROGRAM PRODUCTS THAT LEVERAGE LARGE LANGUAGE MODELS

(71) Applicant: Sanctuary Cognitive Systems Corporation, Vancouver (CA)

(72) Inventors: Geordie Rose, Vancouver (CA); Suzanne Gildert, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,892

(22) Filed: Jul. 9, 2024

(65) Prior Publication Data
US 2024/0359319 A1     Oct. 31, 2024

Related U.S. Application Data

(63) Continuation of application No. 18/417,075, filed on Jan. 19, 2024, now Pat. No. 12,030,183.

(60) Provisional application No. 63/441,897, filed on Jan. 30, 2023.

(51) Int. Cl.
*B25J 9/16*        (2006.01)
*B25J 19/02*      (2006.01)
*G06F 40/279*    (2020.01)
*G06F 40/40*      (2020.01)

(52) U.S. Cl.
CPC ............ *B25J 9/1602* (2013.01); *B25J 9/161* (2013.01); *B25J 9/163* (2013.01); *B25J 9/1653* (2013.01); *B25J 9/1658* (2013.01); *B25J 9/1661* (2013.01); *B25J 9/1671* (2013.01); *B25J 9/1697* (2013.01); *B25J 19/02* (2013.01); *B25J 19/023* (2013.01); *G06F 40/279* (2020.01); *G06F 40/40* (2020.01)

(58) Field of Classification Search
CPC ........ B25J 9/1602; B25J 19/02; B25J 9/1697; B25J 9/161; B25J 9/1658; G06F 40/40; G05B 2219/40113
See application file for complete search history.

(56) References Cited

U.S. PATENT DOCUMENTS

| | | | |
|---|---|---|---|
| 2018/0178379 A1* | 6/2018 | Takeda | B25J 9/1671 |
| 2019/0378019 A1* | 12/2019 | Scheutz | G10L 15/18 |
| 2021/0291363 A1* | 9/2021 | Sarkar | G05D 1/0246 |
| 2022/0274251 A1* | 9/2022 | Leon | G06N 3/047 |
| 2023/0311335 A1* | 10/2023 | Hausman | B25J 5/007 |
| | | | 700/246 |

(Continued)

*Primary Examiner* — Wade Miles
*Assistant Examiner* — Mohammed Yousef Abuelhawa
(74) *Attorney, Agent, or Firm* — Thomas Mahon

(57) ABSTRACT

Robot control systems, methods, control modules and computer program products that leverage one or more large language model(s) (LLMs) in order to achieve at least some degree of autonomy are described. Robot control parameters and/or instructions may advantageously be specified in natural language (NL) and communicated with the LLM via an NL prompt or query. The LLM module provides a task plan in NL, which can be evaluated for at least one fault or error. If at least one fault or error is identified, the LLM module can be queried to provide a resolution.

20 Claims, 5 Drawing Sheets

(56) References Cited

U.S. PATENT DOCUMENTS

2023/0398696 A1\* 12/2023 Kollar ................... B25J 11/008
2024/0157558 A1\* 5/2024 Komukai ............... B25J 9/1661

\* cited by examiner

ROBOT SYSTEMS, METHODS, CONTROL MODULES, AND COMPUTER PROGRAM PRODUCTS THAT LEVERAGE LARGE LANGUAGE MODELS

PRIOR APPLICATION DATA

This application claims priority to U.S. Provisional Patent Application No. 63/441,897, filed on Jan. 30, 2023, titled "Robot Control Systems, Methods, and Computer Program Products That Leverage Large Language Models", the entirety of which is incorporated by reference herein.

TECHNICAL FIELD

The present systems, methods, control modules, and computer program products generally relate to robot control, and particularly relate to deploying, harnessing, and/or generally using a large language model in the control of a robot.

BACKGROUND

Description of the Related Art

Robots are machines that may be deployed to perform tasks. Robots may come in a variety of different form factors, including humanoid form factors. Humanoid robots may be operated by tele-operation systems through which the robot is caused to emulate the physical actions of a human operator or pilot. Special-purpose robots may be designed to perform a specific task, whereas general purpose robots may be designed to perform a multitude of tasks.

Humans perform many tasks in their personal and work lives. Examples of tasks include everything from making a bed, to washing dishes, to loading a dishwasher, to mowing a lawn, to taking inventory, to checking out customers, to stocking shelves, to painting, to hairstyling, to preparing a meal, to cleaning, to taking measurements, to performing calculations, to recording data, to performing analyses, to creating art/music, to performing art/music, to building, to manufacturing, to assembling, to destroying, to disassembling, to displacing, to pick-and-placing, to navigating, and on and on. In many cases, there is a strong desire, and an ongoing need, to automate various tasks so that humans may direct their time and/or attention to other things.

A large language model (LLM) is a form of artificial intelligence that has been trained on a large corpus of text data to produce human-like text responses to natural language (NL) inputs. Popular examples in the art today include the various incarnations of OpenAI™'s Generative Pre-Trained Transformer (GPT), such as text-davinci-003, text-curie-001, text-babbage-001, and text-ada-001. LLMs can be accessed by, or deployed in, text-based user interfaces to allow chat-like interactions between a user and a computer, such as in OpenAI™'s ChatGPT™ application built on the GPT-3™ family of LLMs.

BRIEF SUMMARY

A method may be summarized as using at least one large language model (LLM) in the operation of a robot as described herein. The LLM may be leveraged to automate at least one process selected from a group consisting of: task planning, motion planning, human interaction, and logic reasoning.

A robot system may be summarized as using at least one large language model as described herein. The LLM may be leveraged to automate at least one process selected from a group consisting of: task planning, motion planning, human interaction, and logic reasoning.

A computer program product may be summarized as a non-transitory processor-readable storage medium that stores data and/or processor-executable instructions that, when executed by at least one processor of a robot, cause the robot to use at least one large language model as described herein. The LLM may be leveraged to automate at least one process selected from a group consisting of: task planning, motion planning, human interaction, and logic reasoning.

According to a broad aspect, the present disclosure describes a method of operating a robot system including a robot body, the method comprising: capturing, by at least one sensor of the robot system, sensor data representing information about an environment of the robot body; generating, by at least one processor of the robot system, a natural language (NL) description of at least one aspect of the environment based on the sensor data; providing a first NL query to a large language model (LLM) module, the first NL query including the NL description of at least one aspect of the environment, an NL description of a work objective, an NL description of an instruction set executable by the robot system, and an NL request for a task plan; receiving the task plan from the LLM module, the task plan expressed in NL and including a plurality of steps; determining, by the at least one processor, whether the task plan includes at least one fault; if the task plan includes at least one fault: generating, by the at least one processor, an NL description of the at least one fault; providing a second NL query to the LLM module, the second NL query including at least the NL description of the at least one fault and an NL request for a resolution plan; receiving the resolution plan from the LLM module, the resolution plan expressed in NL; and executing an updated task plan by the robot system, the updated task plan based at least in part on the resolution plan; and if the task plan does not include at least one fault: executing the task plan to completion by the robot system.

The method may further include, if the task plan includes at least one fault, generating an NL description of any steps of the task plan which do not include faults; and the second NL query may further include the NL description of any steps of the task plan which do not include faults.

The resolution plan may include an NL description of at least one resolution selected from a group of resolutions consisting of: adjustment to order of steps in the task plan; adjustment to success criteria for any steps in the task plan; adjustment to any actions expressed in any steps of the task plan; adjustment to any targets of interaction for any steps of the task plan; replacement of any steps of the task plan with at least one new step; removal of at least one step of the task plan; and the updated task plan to replace all steps of the task plan.

Determining whether the task plan includes at least one fault may comprise: executing at least one step of the task plan; and identifying, for each step of the at least one step, whether execution of the respective step produces a respective fault scenario. Each respective fault scenario may include at least one scenario selected from a group of scenarios consisting of: execution of the step produces results which are not in alignment with the work objective; execution of the step inhibits execution of at least one other step in the task plan; and execution of the step produces at least one unacceptable effect in the environment.

Determining whether the task plan includes at least one fault may comprise: determining whether the task plan violates any rules in a set of rules specified in at least part of a reasoning engine.

Determining whether the task plan includes at least one fault may comprise: accessing an environment model which represents the environment; simulating, by the at least one processor, at least one step of the task plan in the environment model; and identifying, by the at least one processor, whether each step of the at least one step of the task plan, when execution is simulated, produces a respective fault scenario. Determining whether the task plan includes at least one fault may further comprise: simulating, by the at least one processor, at least one additional step of the task plan in the environment model if no respective fault scenario is identified in simulation of each step of the at least one step of the task plan; and identifying, by the at least one processor, whether each step of the at least one additional step of the task plan, when execution is simulated, produces a respective fault scenario. The respective fault scenario may include at least one scenario selected from a group of scenarios consisting of: simulated execution of the step produces simulated results which are not in alignment with the work objective; simulated execution of the step inhibits execution of at least one other step in the task plan; and simulated execution of the step produces at least one unacceptable effect in the environment model.

According to another broad aspect, the present disclosure describes a robot control module comprising at least one non-transitory processor-readable storage medium storing processor-executable instructions or data that, when executed by at least one processor of a processor-based system, cause the processor-based system to: capture, by at least one sensor carried by a robot body of the processor-based system, sensor data representing information about an environment of the robot body; generate, by the at least one processor, a natural language (NL) description of at least one aspect of the environment based on the sensor data; provide a first NL query to a large language model (LLM) module, the first NL query including the NL description of at least one aspect of the environment, an NL description of a work objective, an NL description of an instruction set executable by the processor-based system, and an NL request for a task plan; receive the task plan from the LLM module, the task plan expressed in NL and including a plurality of steps; determine, by the at least one processor, whether the task plan includes at least one fault; if the task plan includes at least one fault: generate, by the at least one processor, an NL description of the at least one fault; provide a second NL query to the LLM module, the second NL query including at least the NL description of the at least one fault and an NL request for a resolution plan; receive the resolution plan from the LLM module, the resolution plan expressed in NL; and execute an updated task plan by the processor-based system, the updated task plan based at least in part on the resolution plan; and if the task plan does not include at least one fault: execute the task plan to completion by the processor-based system.

The processor-executable instructions or data may further cause the at least one processor to, if the task plan includes at least one fault, generate an NL description of any steps of the task plan which do not include faults; and the second NL query may further include the NL description of any steps of the task plan which do not include faults.

The resolution plan may include an NL description of at least one resolution selected from a group of resolutions consisting of: adjustment to order of steps in the task plan; adjustment to success criteria for any steps in the task plan; adjustment to any actions expressed in any steps of the task plan; adjustment to any targets of interaction for any steps of the task plan; replacement of any steps of the task plan with at least one new step; removal of at least one step of the task plan; and the updated task plan to replace all steps of the task plan.

The processor-executable instructions or data which cause the at least one processor to determine whether the task plan includes at least one fault may cause the processor-based system to: execute at least one step of the task plan; and identify, by the at least one processor for each step of the at least one step, whether execution of the respective step produces a respective fault scenario. Each respective fault scenario may include at least one scenario selected from a group of scenarios consisting of: execution of the step produces results which are not in alignment with the work objective; execution of the step inhibits execution of at least one other step in the task plan; and execution of the step produces at least one unacceptable effect in the environment.

The processor-executable instructions or data which cause the at least one processor to determine whether the task plan includes at least one fault may cause the at least one processor to: determine whether the task plan violates any rules in a set of rules specified in at least part of a reasoning engine.

The processor-executable instructions or data which cause the at least one processor to determine whether the task plan includes at least one fault may cause the at least one processor to: access an environment model which represents the environment; simulate, by the at least one processor, at least one step of the task plan in the environment model; and identify, by the at least one processor, whether each step of the at least one step of the task plan, when execution is simulated, produces a respective fault scenario. The processor-executable instructions or data which cause the at least one processor to determine whether the task plan includes at least one fault may further cause the at least one processor to: simulate, by the at least one processor, at least one additional step of the task plan in the environment model if no respective fault scenario is identified in simulation of each step of the at least one step of the task plan; and identify, by the at least one processor, whether each step of the at least one additional step of the task plan, when execution is simulated, produces a respective fault scenario. The respective fault scenario may include at least one scenario selected from a group of scenarios consisting of: simulated execution of the step produces simulated results which are not in alignment with the work objective; simulated execution of the step inhibits execution of at least one other step in the task plan; and simulated execution of the step produces at least one unacceptable effect in the environment model.

According to yet another broad aspect, the present disclosure describes a robot system comprising: a robot body; at least one sensor; a robot controller including at least one processor and at least one non-transitory processor-readable storage medium, the at least one non-transitory processor-readable storage medium storing processor-executable instructions which when executed by the at least one processor cause the robot system to: capture, by the at least one sensor, sensor data representing information about an environment of the robot body; generate, by the at least one processor, a natural language (NL) description of the at least one aspect of the environment based on the sensor data; provide a first NL query to a large language model (LLM) module, the first NL query including the NL description of at least one aspect of the environment, an NL description of a work objective, an NL description of an instruction set executable by the robot system, and an NL request for a task plan; receive the task plan from the LLM module, the task plan expressed in NL and including a plurality of steps; determine, by the at least one processor, whether the task plan includes at least one fault; if the task plan includes at least one fault: generate, by the at least one processor, an NL description of the at least one fault; provide a second NL query to the LLM module, the second NL query including at least the NL description of the at least one fault and an NL request for a resolution plan; receive the resolution plan from the LLM module, the resolution plan expressed in NL; and execute an updated task plan by the robot system, the updated task plan based at least in part on the resolution plan; and if the task plan does not include at least one fault: execute the task plan to completion by the robot system.

The task plan may indicate at least one action performable by the robot system expressed in natural language; and the processor-executable instructions may further cause the robot system to generate, by the at least one processor, a robot-language task plan based on the task plan as expressed in NL, the robot-language task plan comprising a set of robot control instructions which when executed by the at least one processor cause the robot system to perform the at least one action of the at least one action indicated in the task plan.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
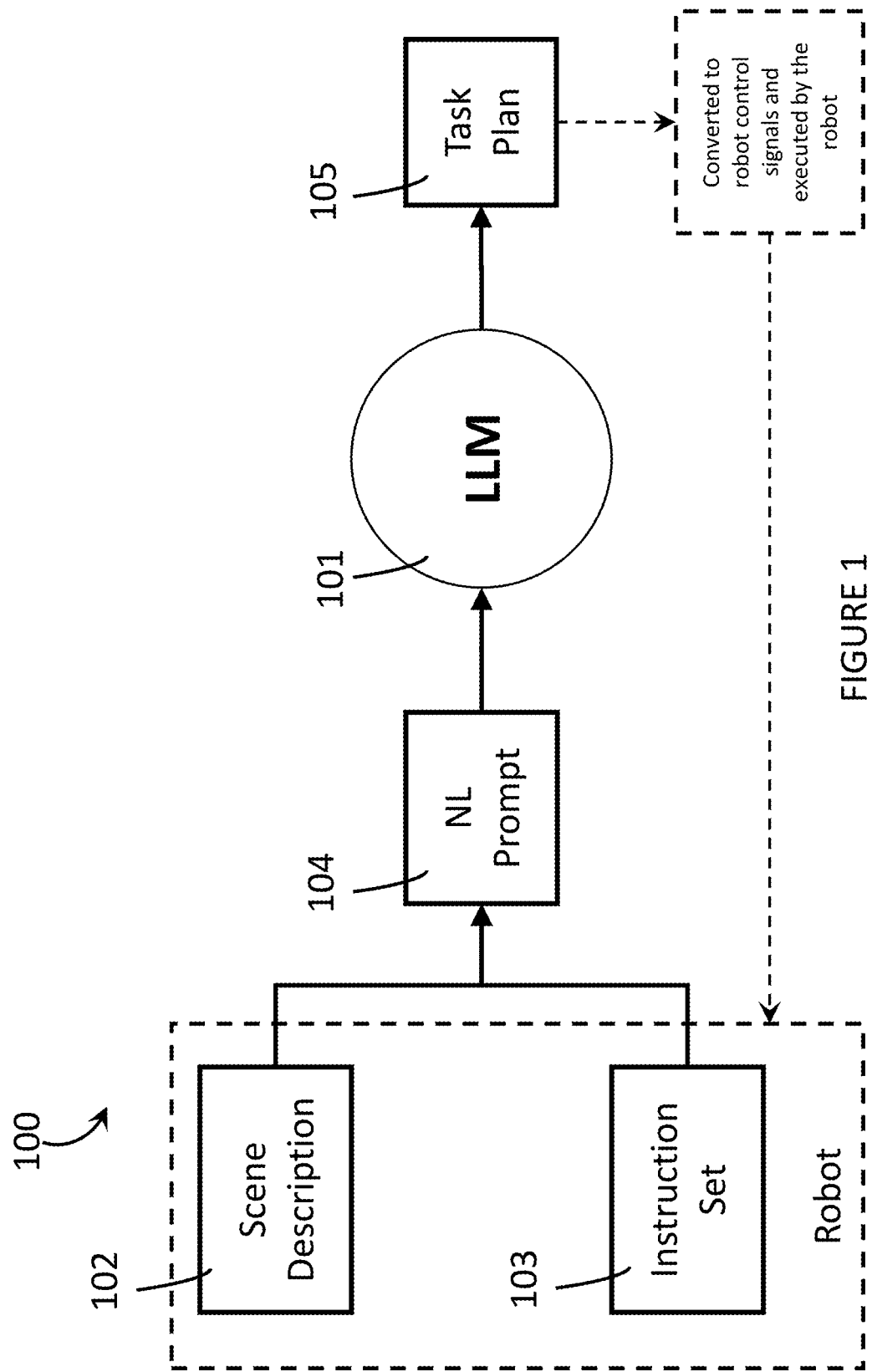
FIG. 1 is a flow diagram showing an exemplary implementation an automated Task Planner that leverages an LLM in accordance with the present systems, control modules, methods, and computer program products.

The following description sets forth specific details in order to illustrate and provide an understanding of the various implementations and embodiments of the present systems, methods, control modules, and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, control modules, and computer program products.

The various implementations described herein provide systems, methods, control modules, and computer program products that use one or more LLM(s) to enhance, facilitate, augment, or implement control of one or more robot system(s). Exemplary robot systems that may employ the teachings of the present systems, methods, control modules, and computer program products include, without limitation, the general-purpose humanoid robots developed by Sanctuary Cognitive Systems Corporation, various aspects of which are described in U.S. patent application Ser. No. 18/375,943, U.S. patent application Ser. No. 18/513,440, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/316,693, U.S. Provisional Patent Application Ser. No. 63/253,591, U.S. Provisional Patent Application Ser. No. 63/293,968, U.S. Provisional Patent Application Ser. No. 63/293,973, and/or U.S. Provisional Patent Application Ser. No. 63/278,817, each of which is incorporated herein by reference in its entirety.

In some implementations, a robot system or control module may employ a finite Instruction Set comprising generalized reusable work primitives that can be combined (in various combinations and/or permutations) to execute a task. For example, a robot control system may store a library of reusable work primitives each corresponding to a respective basic sub-task or sub-action that the robot is operative to autonomously perform (hereafter referred to as an Instruction Set). A work objective may be analyzed to determine a sequence (i.e., a combination and/or permutation) of reusable work primitives that, when executed by the robot, will complete the work objective. The robot may execute the sequence of reusable work primitives to complete the work objective. In this way, a finite Instruction Set may be used to execute a wide range of different types of tasks and work objectives across a wide range of industries. This approach is described in US Patent Publication No. 2022-0258340 based on U.S. patent application Ser. No. 17/566,589, which is incorporated herein by reference in its entirety.

To expand on the above, a general-purpose robot is able to complete multiple different work objectives. As used throughout this specification and the appended claims, the term "work objective" refers to a particular task, job, assignment, or application that has a specified goal and a determinable outcome, often (though not necessarily) in the furtherance of some economically valuable work. Work objectives exist in many aspects of business, research and development, commercial endeavors, and personal activities. Exemplary work objectives include, without limitation: cleaning a location (e.g., a bathroom) or an object (e.g., a bathroom mirror), preparing a meal, loading/unloading a storage container (e.g., a truck), taking inventory, collecting one or more sample(s), making one or more measurement(s), building or assembling an object, destroying or disassembling an object, delivering an item, harvesting objects and/or data, and so on. The various implementations described herein provide robots, systems, control modules, computer program products, and methods for operating a robot system, to at least semi-autonomously complete tasks or work objectives.

In accordance with the present robots, systems, control modules, computer program products, and methods, a work objective can be deconstructed or broken down into a "workflow" comprising a set or plurality of "work primitives", where successful completion of the work objective involves performing each work primitive in the workflow. Depending on the specific implementation, completion of a work objective may be achieved by (i.e., a workflow may comprise): i) performing a corresponding set of work primitives sequentially or in series; ii) performing a corresponding set of work primitives in parallel; or iii) performing a corresponding set of work primitives in any combination of in series and in parallel (e.g., sequentially with overlap) as suits the work objective and/or the robot performing the work objective. Thus, in some implementations work primitives may be construed as lower-level activities, steps, or sub-tasks that are performed or executed as a workflow in order to complete a higher-level work objective.

Advantageously, and in accordance with the present robots, systems, control modules, computer program products, and methods, a catalog of "reusable" work primitives may be defined. A work primitive is reusable if it may be generically invoked, performed, employed, or applied in the completion of multiple different work objectives. For example, a reusable work primitive is one that is common to the respective workflows of multiple different work objectives. In some implementations, a reusable work primitive may include at least one variable that is defined upon or prior to invocation of the work primitive. For example, "pick up *object*" may be a reusable work primitive where the process of "picking up" may be generically performed at least semi-autonomously in furtherance of multiple different work objectives and the *object* to be picked up may be defined based on the specific work objective being pursued.

As stated previously, the various implementations described herein provide robots, systems, control modules, computer program products, and methods where a robot is enabled to at least semi-autonomously perform tasks or complete work objectives. Unless the specific context requires otherwise, the term "autonomously" is used throughout this specification and the appended claims to mean "without control by another party" and the term "semi-autonomously" is used to mean "at least partially autonomously." In other words, throughout this specification and the appended claims, the term "semi-autonomously" means "with limited control by another party" unless the specific context requires otherwise. An example of a semi-autonomous robot is one that can independently and/or automatically execute and control some of its own low-level functions, such as its mobility and gripping functions, but relies on some external control for high-level instructions such as what to do and/or how to do it.

In accordance with the present robots, systems, control modules, computer program products, and methods, a catalog of reusable work primitives may be defined, identified, developed, or constructed such that any given work objective across multiple different work objectives may be completed by executing a corresponding workflow comprising a particular combination and/or permutation of reusable work primitives selected from the catalog of reusable work primitives. Once such a catalog of reusable work primitives has been established, one or more robot(s) may be trained to autonomously or automatically perform each individual reusable work primitive in the catalog of reusable work primitives without necessarily including the context of: i) a particular workflow of which the particular reusable work primitive being trained is a part, and/or ii) any other reusable work primitive that may, in a particular workflow, precede or succeed the particular reusable work primitive being trained. In this way, a semi-autonomous robot may be operative to autonomously or automatically perform each individual reusable work primitive in a catalog of reusable work primitives and only require instruction, direction, or guidance from another party (e.g., from an operator, user, or pilot) when it comes to deciding which reusable work primitive(s) to perform and/or in what order. In other words, an operator, user, pilot, or LLM module may provide a workflow consisting of reusable work primitives to a semi-autonomous robot system and the semi-autonomous robot system may autonomously or automatically execute the reusable work primitives according to the workflow to complete a work objective. For example, a semi-autonomous humanoid robot may be operative to autonomously look left when directed to look left, autonomously open its right end effector when directed to open its right end effector, and so on, without relying upon detailed low-level control of such functions by a third party. Such a semi-autonomous humanoid robot may autonomously complete a work objective once given instructions regarding a workflow detailing which reusable work primitives it must perform, and in what order, in order to complete the work objective. Furthermore, in accordance with the present robots, systems, methods, control modules and computer program products, a robot system may operate fully autonomously if it is trained or otherwise configured to (e.g. via consultation with an LLM module, which can be included in the robot system) analyze a work objective and independently define a corresponding workflow itself by deconstructing the work objective into a set of reusable work primitives from a library of reusable work primitives that the robot system is operative to autonomously perform.

In the context of a robot system, reusable work primitives may correspond to basic low-level functions that the robot system is operable to (e.g., autonomously or automatically) perform and that the robot system may call upon or execute in order to achieve something. Examples of reusable work primitives for a humanoid robot include, without limitation: look up, look down, look left, look right, move right arm, move left arm, close right end effector, open right end effector, close left end effector, open left end effector, move forward, turn left, turn right, move backwards, and so on, as well as cognitive functions like analyze, calculate, plan, determine, reason, and so on; however, a person of skill in the art will appreciate that: i) the foregoing list of exemplary reusable work primitives for a humanoid robot is by no means exhaustive; ii) the present robots, systems, control modules, computer program products, and methods, the high-level functions that a robot is operative to perform are deconstructed or broken down into a set of basic components or constituents, referred to throughout this specification and the appended claims as "work primitives". Unless the specific context requires otherwise, work primitives may be construed as the building blocks of which higher-level robot functions are constructed.

In some implementations training a robot system to autonomously perform a reusable work primitive may be completed in a real-world environment or a simulated environment. Once a robot has been trained to autonomously perform a catalog of reusable work primitives, operation of the robot may be abstracted to the level of reusable work primitives; e.g. an LLM module which prepares a task plan for the robot may do so by determining which reusable work primitive(s) to perform and, in some implementations, in what order to perform them, and the robot may have sufficient autonomy or automation to execute a complete work objective based on such limited control instructions.

As described previously, "clean a bathroom mirror" is an illustrative example of a work objective that can be deconstructed into a set of work primitives to achieve a goal and for which the outcome is determinable. The goal in this case is a clean bathroom mirror, and an exemplary set of work primitives (or workflow) that completes the work objective is as follows:

| Work Primitive Index | Work Primitive |
| --- | --- |
| 1 | Locate cleaning solution |
| 2 | Grasp the cleaning solution |
| 3 | Locate mirror |
| 4 | Aim the cleaning solution at the mirror |
| 5 | Dispense the cleaning solution onto the mirror |

-continued

| Work Primitive Index | Work Primitive |
| --- | --- |
| 6 | Locate the cleaning cloth |
| 7 | Grasp the cleaning cloth |
| 8 | Pass the cleaning cloth over the entire surface of the mirror |
| 9 | Return to ready |

A person of skill in the art will appreciate that the exemplary workflow above, comprising nine work primitives, is used as an illustrative example of a workflow that may be deployed to complete the work objective of cleaning a bathroom mirror; however, in accordance with the present robots, systems, control modules, computer program products, and methods the precise definition and composition of each work primitive and the specific combination and/or permutation of work primitives selected/executed to complete a work objective (i.e., the specific construction of a workflow) may vary in different implementations. For example, in some implementations work primitives 3, 4, and 5 above (i.e., locate mirror, aim the cleaning solution at the mirror, and dispense the cleaning solution onto the mirror) may all be combined into one higher-level work primitive as "spray cleaning solution on the mirror" whereas in other implementations those same work primitives may be broken down into additional lower-level work primitives as, for example:

Locate the mirror
Identify the boundaries of the mirror
Aim the cleaning solution at a first location within the boundaries of the mirror
Squeeze the cleaning solution
Aim the cleaning solution at a second location within the boundaries of the mirror
Squeeze the cleaning solution
Etc.

Based on the above example and description, a person of skill in the art will appreciate that the granularity of work primitives may vary across different implementations of the present robots, systems, control modules, computer program products, and methods. Furthermore, in accordance with the present robots, systems, control modules, computer program products, and methods the work primitives are advantageously "reusable" in the sense that each work primitive may be employed, invoked, applied, or "reused" in the performance of more than one overall work objective. For example, while cleaning a bathroom mirror may involve the work primitive "grasp the cleaning solution," other work objectives may also use the "grasp the cleaning solution" work primitive, such as for example "clean the toilet," "clean the window," and/or "clean the floor." In some implementations, work primitives may be abstracted to become more generic. For example, "grasp the cleaning solution" may be abstracted to "grasp the spray bottle" or "grasp the *object1*" where the *object1* variable is defined as "*object1*=spray bottle", and "locate the mirror" may be abstracted to "locate the object that needs to be sprayed" or simply "locate *object2*" where "*object2*=mirror". In such cases, the "grasp the spray bottle" work primitive may be used in tasks that do not involve cleaning, such as "paint the wall" (where the spray bottle=spray paint), "style the hair" (where the spray bottle=hairspray), or "prepare the stir-fry meal" (where the spray bottle=cooking oil spray).

Unless the specific context requires otherwise, throughout this specification and the appended claims reference to an "LLM" or "LLM module" should be construed as including one or more LLM(s) or one or more LLM module(s). Further, reference to interactions with an LLM or LLM module (e.g. providing input to the LLM, receiving output from the LLM, asking the LLM, querying the LLM, etc.) can be performed through an application or interface which uses the LLM module (e.g. a chat application which accesses an LLM to interpret inputs and formulate outputs).

In some implementations of the present systems, methods, control modules, and computer program products, an LLM is used to assist in determining a sequence of reusable work primitives (hereafter "Instructions"), selected from a finite library of reusable work primitives (hereafter "Instruction Set"), that when executed by a robot will cause or enable the robot to complete a task. For example, a robot control system may take a Natural Language (NL) command as input and return a Task Plan formed of a sequence of allowed Instructions drawn from an Instruction Set whose completion achieves the intent of the NL input. Take as an exemplary application the task of "kitting" a chess set comprising sixteen white chess pieces and sixteen black chess pieces. A person could say, or type, to the robot, e.g., "Put all the white pieces in the right bin and all the black pieces in the left bin" and an LLM could support a fully autonomous system that converts this input into a sequence of allowed Instructions that successfully performs the task. In this case, the LLM may help to allow the robot to perform general tasks specified in NL. General tasks include but are not limited to all work in the current economy.

Throughout the present systems, methods, control modules, and computer program products, the term "natural language" refers to any language that has evolved naturally in humans and includes as examples without limitation: English, French, Spanish, Chinese (Mandarin, Yue, Wu, etc.), Portuguese, Japanese, Russian, Korean, Arabic, Hebrew, German, Polish, Hindi, Bengali, Italian, Punjabi, Vietnamese, Hausa, Swedish, Finnish, and so on.

FIG. 1 is a flowchart diagram which illustrates an exemplary implementation of such an automated Task Planner as method 100. An LLM 101, such as but not limited to OpenAI™'s text-davinci-003, is provided or otherwise combined with: i) a description of a current scene 102 generated using a perception system of a robot system, ii) a description of an Instruction Set 103 formed of parameterized reusable work primitives or Instructions that can be executed by the robot system, and iii) a wrapper that incorporates an NL phrase into a prompt 104, to automatically generate a Task Plan 105, which can then be executed by the robot system to achieve the intent of the NL input.

While FIG. 1 shows Scene Description 102 and Instruction Set 103 as being contained "within" the Robot (i.e., within the dotted-line box that represents the Robot) and NL Prompt 104, LLM 101, and Task Plan 105 (as well as the conversion to robot control signals) as being "outside" the Robot (i.e., outside the dotted-line box that represents the Robot), this is not intended to be limiting and is done so for illustrative purposes only. While it is true that in some implementations any or all of NL Prompt 104, LLM 101, and/or Task Plan 105 (as well as the conversion to robot control signals) may be stored, generated, accessed or otherwise exist outside (or off-board or remote from) the Robot, in other implementations any or all of NL Prompt 104, LLM 101, and/or Task Plan 105 (as well as the conversion to robot control signals) may be stored, generated, accessed, or otherwise exist within (or on-board) the Robot.

Below is DIALOGUE 1, which includes an exemplary QUERY and RESPONSE, obtained by running a python script:
DIALOGUE 1
QUERY 1:
There is white chess pawn number 1, white chess pawn number 2, black chess pawn number 1, black chess pawn number 2, a white chess rook, a black chess bishop and two blue bins on the table, and a person stood opposite me. My goal is to do what the person says. The person says 'Put all the white pieces in the right bin and all the black pieces in the left bin'. I can only choose strictly from the following options:
1.) Grasp object
2.) Place object on object
3.) Look at object
4.) Slice object
5.) Say hello to the person
6.) Drop object in object
Where object should be replaced with an appropriate object on the table. Here is a list of the above commands I should perform in order to complete my goal:
RESPONSE 1:
Step 1. Grasp white chess pawn number 1
Step 2. Place white chess pawn number 1 in right bin
Step 3. Grasp white chess pawn number 2
Step 4. Place white chess pawn number 2 in right bin
Step 5. Grasp black chess pawn number 1
Step 6. Place black chess pawn number 1 in left bin
Step 7. Grasp black chess pawn number 2
Step 8. Place black chess pawn number 2 in left bin
Step 9. Grasp white chess rook
Step 10. Place white chess rook in right bin
Step 11. Grasp black chess bishop
Step 12. Place black chess bishop in left bin
END In the above example, the RESPONSE provided by the LLM corresponds to a Task Plan. If a robot system executes the sequence of Instructions specified in the Task Plan, then the task specified in NL via the PROMPT will be successfully completed by the robot system. Throughout this disclosure, the term "motion plan" could be used in place of "task plan". In this regard, the sequence of instructions specified in the task plan (motion plan) can comprise instructions which cause the robot to undergo a series of motions or movements.

Figure 2:
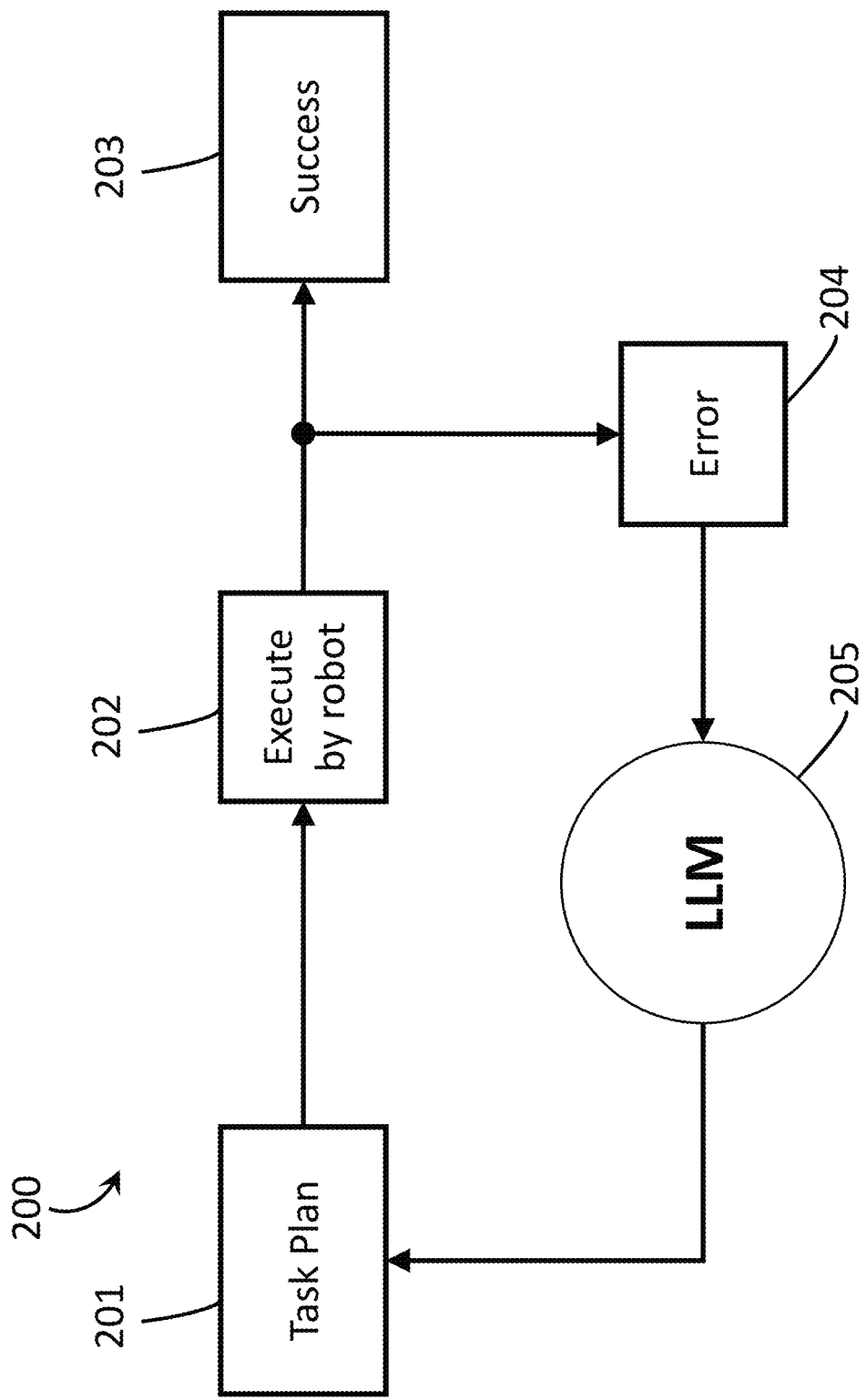
FIG. 2 is a flow diagram showing another exemplary implementation of operation of a robot system that leverages an LLM in accordance with the present systems, control modules, methods, and computer program products.

In some implementations, an LLM may be used to autonomously troubleshoot a task plan as illustrated in the flow-diagram of FIG. 2. For example, if a given task plan 201 fails to execute at 202 (i.e., fails to proceed through to completion and/or fails to complete an intended task) or encounters an error or fault as shown by 204, an NL prompt can be sent (back) to the LLM at 205, including all of the successful parts of the Task Plan executed, with additional verbiage describing what failed and asking the LLM what to do next. Such an NL prompt can be autonomously generated and sent. In addition, an external checker can review a proposed plan and reject it for some reason. In some implementations, the external checker can simulate execution of the task plan by the robot virtually (i.e. can emulate 202 in FIG. 202). In other implementations, the external checker could be a logic-based system, such as the CYC machine reasoning AI platform from Cycorp Inc. A reason for rejecting could be, for example, a safety violation in relation to robot safety or safety of any human or other living being. In the event of a rejection, an NL prompt or query could be sent back to the LLM modified to prevent a plan from failing the external check. If no errors or faults are found and/or the task plan executes properly, success is achieved as shown at 203.

Throughout this disclosure, reference to an error or fault in a task plan refers to at least one problem in the task plan, such that if executed the task plan will produce undesirable results or an undesirable scenario. Detailed examples are discussed later with reference to at least act 310 in FIG. 3.

Figure 3:
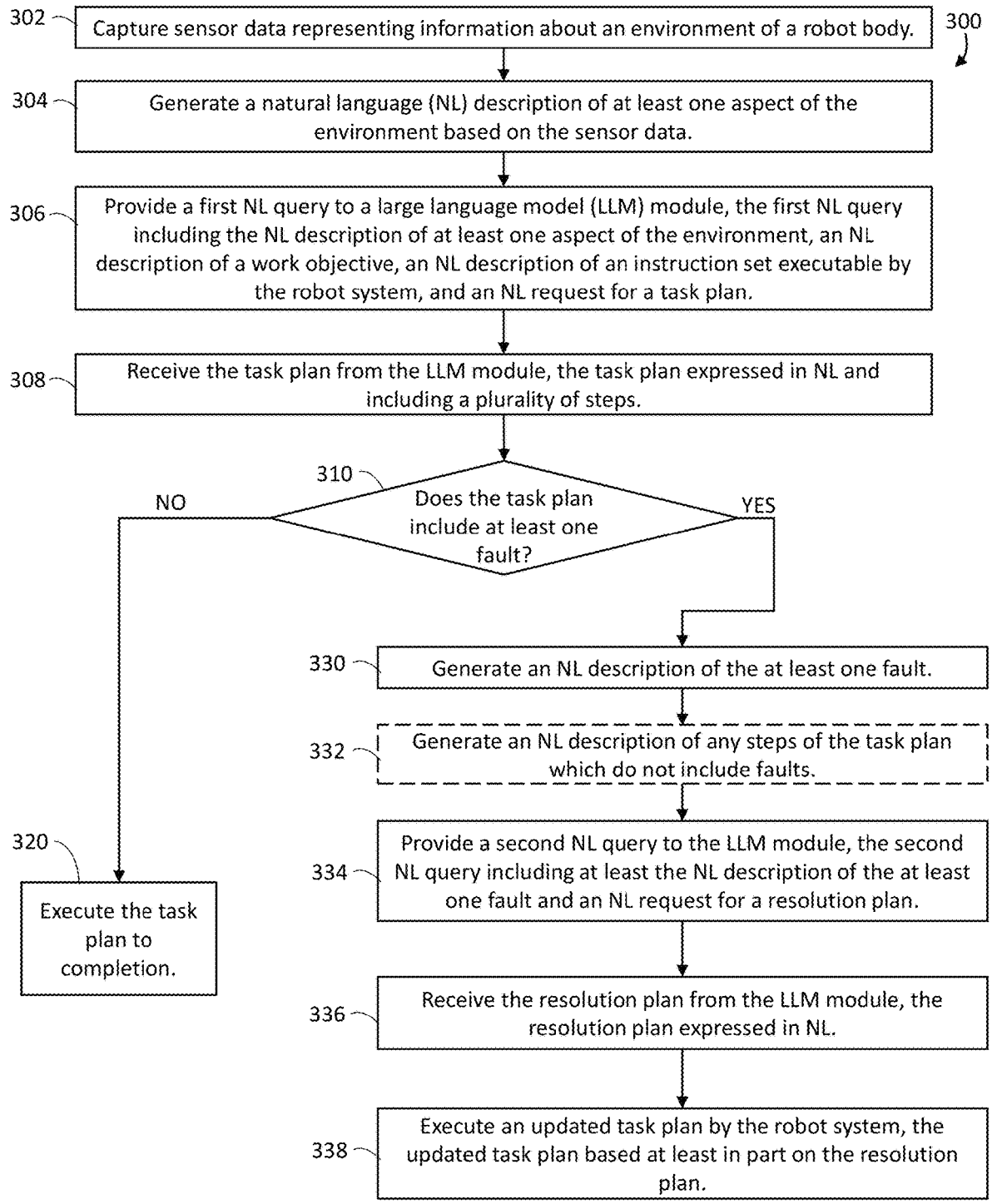
FIG. 3 is a flow diagram showing yet another exemplary implementation of operation of a robot system that leverages an LLM in accordance with the present systems, control modules, methods, and computer program products.

FIG. 3 is a flowchart diagram which illustrates an exemplary method 300 of operation of a robot system. Method 300 in FIG. 3 is similar in at least some respects to the method 100 of FIG. 1 and method 200 in FIG. 2. In general, method 300 in FIG. 3 describes detailed implementations by which method 100 in FIG. 1 and method 200 in FIG. 2 can be achieved. Method 300 is a method of operation of a robot system (such as robot system 500 discussed with reference to FIG. 5). In general, throughout this specification and the appended claims, a method of operation of a robot system is a method in which at least some, if not all, of the various acts are performed by the robot system. For example, certain acts of a method of operation of a robot system may be performed by at least one processor or processing unit (hereafter "processor") of the robot system communicatively coupled to a non-transitory processor-readable storage medium of the robot system (collectively a robot controller of the robot system) and, in some implementations, certain acts of a method of operation of a robot system may be performed by peripheral components of the robot system that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. The non-transitory processor-readable storage medium of the robot system may store data (including, e.g., at least one library of reusable work primitives and at least one library of associated percepts) and/or processor-executable instructions that, when executed by the at least one processor, cause the robot system to perform the method and/or cause the at least one processor to perform those acts of the method that are performed by the at least one processor. The robot system may communicate, via communications and networking hardware communicatively coupled to the robot system's at least one processor, with remote systems and/or remote non-transitory processor-readable storage media. Thus, unless the specific context requires otherwise, references to a robot system's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot system and the rest of the robot hardware. In other words, a robot system's non-transitory processor-readable storage medium may include non-transitory processor-readable storage media located on-board a robot body of the robot system and/or non-transitory processor-readable storage media located remotely from the robot body, unless the specific context requires otherwise. Further, a method of operation of a robot system such as method 300 (or any of the other methods discussed herein) can be implemented as a robot control module or computer program product. Such a control module or computer program product comprises processor-executable instructions or data that, when the control module or computer program product is stored on a non-transitory processor-readable storage medium of the robot system, and the control module or computer program product is executed by at least one processor of the robot system, the control module or computer program product (or the processor-executable instructions or data thereof) cause the robot system to perform acts of the method.

Returning to FIG. 3, method 300 as illustrated includes acts 302, 304, 306, 308, and 310, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 302, sensor data is captured representing information about an environment of a robot body of the robot system. To this end, the robot body can carry at least one exemplary sensor which captures the sensor data, as discussed later with reference to FIG. 5. In some implementations, the captured sensor data can be comprehensive, providing a detailed and relatively complete representation of the environment of the robot (e.g. a full field of view around the robot body within a certain distance, with detailed representations of objects or features in the environment around the robot body). However, such detailed sensor data is not necessary. In other implementations, the sensor data may represent only a portion of the environment around of the robot body (e.g., a limited field of view visible to an image sensor of the robot body). In yet other implementations, the sensor data may be even more limited, for example representing only a single object or feature of the environment. Precisely how detailed the sensor data representing information about the environment should be can be determined as appropriate for a given application.

At 304, at least one processor of the robot system generates a natural language (NL) description of at least one aspect of the environment based on the sensor data. Such an NL description is referenced (as a scene description) in FIG. 1 at 102. The NL description of the at least one aspect of the environment does not need to describe every feature or object present in the sensor data, but rather can focus on one or more features or objects of particular relevance.

In an exemplary implementation, the at least one processor executes an object or feature detection model (e.g. a classification module such as a YOLO model, or any other appropriate model) which identifies objects or features in the environment (as represented in the sensor data), and assigns text labels to such features or objects. Such text labels can be in "robot-language". Throughout this disclosure, the term "robot language" or similar refers to language which is a result of, or intended for, use within a robot or programmatic context, as opposed to natural human language which humans use to communicate with each other. With reference to the chess kit example earlier, a particular chess pawn could be identified in robot language as "chess_pawn_54677". This is an example of robot language in that underscores are used instead of spaces, and a numerical identifier for the pawn is far higher than a human would use in normal context.

Regardless, there are commonalities between robot language and human language which can be useful (particularly, common vocabulary). In the example of "chess_pawn_54677", the terms "chess" and "pawn" are also used in human natural language. In order to generate the NL description of at least one aspect of the environment, the at least one processor can execute a text string matching module which matches text in robot-language text labels to NL vocabulary. For example, an NL description of "chess_pawn_54677" can be generated as "chess pawn 1". Further, identified objects or features in the environment can also be associated with metadata which can be used in generating the NL description of the environment. For example, the label "chess_pawn_54677" can be associated with metadata indicating a color of the chess pawn (typically "white" or "black"). The at least one processor can use this metadata to generate an NL description of "chess_pawn_54677" as "white chess pawn 1", for example. The inclusion of metadata is not necessary however. For example, the label could also indicate such information (e.g. "white_chess_pawn_54677").

Additional NL descriptions of other aspects of the environment can also be generated. With reference to the exemplary prompt discussed above, NL descriptions for several different chess pieces, the bins, the person, and the table are generated. Such NL descriptions can be generated in a similar manner to as discussed above.

Further, generating the NL description of the environment is not necessarily limited to generating NL descriptions of objects or features in the environment. In some implementations, locations or placement of such objects or features can also be described. With reference to the exemplary prompt discussed above, the sentence "There is white chess pawn number 1, white chess pawn number 2, black chess pawn number 1, black chess pawn number 2, a white chess rook, a black chess bishop and two blue bins on the table, and a person stood opposite me." Describes several objects in the environment, as well as their positions. Such an NL description could be generated by the at least one processor by, for example, populating a template description with a list of objects, based on where said objects fit into the template.

At 306, a first NL query is provided to a large language model (LLM) module. In some implementations, the LLM module is a software or data module stored on at least one non-transitory processor-readable storage medium of the system (either at the robot body or at a robot controller remote from the robot body). In such implementations, the first NL query can be prepared and provided as input to the LLM module by the at least one processor of the robot system. In other implementations, the LLM module can be a software or data module stored at a non-transitory processor readable storage medium of a device separate from the robot system. In yet other implementations, the LLM module can refer to a hardware module which receives input prompts and executes the LLM module on the inputs. In such other implementations, the first NL query can be prepared by the at least one processor of the robot system, and provided to the device where the LLM module is via a communication interface of the robot system. As one specific example, the LLM module can be stored at one or more servers remote from the robot body, and may take prompts as input by a website, form, or appropriate API. The at least one processor of the robot system can prepare the first NL query in the appropriate format, and the robot system can send the first NL query via the communication interface of the robot system.

The first NL query provided to the LLM module includes the NL description of at least one aspect of the environment, as generated at 304. Additionally, the first NL query includes an NL description of a work objective, and NL description of an Instruction Set executable by the robot system, and an NL request for a task plan. Each of these NL descriptions are described in detail below.

As mentioned earlier, a work objective generally refers to a particular task, job, assignment, or application that has a specified goal and determinable outcome. An NL description of such a work objective is an expression of such a work objective in a format natural to humans. With reference to the example of kitting the chess set discussed earlier, the prompt includes the phrase "My goal is to do what the person says." This in itself can be considered as an NL description of a work objective, but further input provides more details on specific goals the robot system should be complete. In the example, the prompt also includes the phrase "The person says 'Put all the white pieces in the right bin and all the black pieces in the left bin'." This can also be considered an NL description of a work objective, and provides a specific statement on what the robot system is expected to do. In some implementations, the NL description of the work objective comprises the entirety of the two phrases "My goal is to do what the person says. The person says 'Put all the white pieces in the right bin and all the black pieces in the left bin'."

The NL description of the work objective can be based on various information or data. In some implementations, an indication of the work objective may be made explicitly available to the robot system (e.g. sent from a management device or server to the robot system, or stored in at least one non-transitory processor-readable storage medium of the robot system). The indication of the work objective can be made available to the robot system in an NL format, such that the at least one processor only needs to access the indication of the work objective and provide the same to the LLM module. In this sense, it is not necessary for the at least one processor of the robot system to generate the NL description of the work objective, but rather an existing NL description of the work objective can be provided to the LLM module. Alternatively, the indication of the work objective may not be in NL format (e.g. it may be in robot-language), and the at least one processor may generate the NL description of the work objective based on the indication of the work objective (e.g. by executing a robot language conversion module such as a text-string matching module similar to as discussed earlier). In other implementations, the at least one processor of the robot system may generate the NL description of the work objective based on other information, such as a role in which the robot is deployed. In this context, a "role" generally refers to a category of purposes which a robot may serve within a pertinent environment. For example, a janitorial robot can serve a role of cleaning up a particular area or facility. In such a case, with reference to the earlier example of kitting the chess set, the at least one processor may generate an NL description of a work objective as "Clean up loose chess pieces and place in appropriate bins".

NL descriptions of work objectives can be generated based on any appropriate additional information. In another case, capabilities of the robot system may be accounted for when generating an NL description of a work objective. For example, a robot body which lacks locomotion elements can only successfully complete work objectives in an immediate area of the robot body.

As mentioned earlier, the Instruction Set executable by the robot system can be a library of reusable work primitives, such as "grasp object", "place object on object", or any other appropriate action. These examples are presented here in natural language, but may be stored and accessed in a robot-language form, such as "grasp (object)" or "place (object1, object2)" (as non-limiting examples). In the example of kitting the chess set discussed earlier, the "options" 1, 2, 3, 4, 5, and 6 represent an NL description of the Instruction Set executable by the robot system. The exemplary prompt also includes qualifying statements "I can only choose strictly from the following options:" and "Where object should be replaced with an appropriate object on the table.", which provide the LLM module additional information on how the NL description of the Instruction Set should be interpreted, used, or applied. Such qualifying statements can be added, removed, or altered as appropriate for a given application and a given Instruction Set. Such qualifying statements could further be included in the first NL query, for example by inclusion in a template on which the first NL query is based, as is discussed in more detail later.

In some implementations, the NL description of the Instruction Set can be pre-generated and loaded to the robot system, such that the robot system can provide this pre-generated NL description of the Instruction Set to the LLM module at 306. For example, a management device, server, or configuration device can generate the NL description of the Instruction Set, which can be stored at a non-transitory processor-readable storage medium of the robot system for subsequent access (e.g. during configuration or deployment of the robot system). As a specific example, a reusable work primitive "place (object1, object2)" can be stored with metadata of an NL description of the reusable work primitive as "place object on object". Such NL descriptions of instructions can be provided manually by a human, or can be generated by at least one processor (and possibly reviewed and/or modified by a human for accuracy).

In some implementations, the NL description of the Instruction Set can be generated by the robot system. Regardless of where generation of the NL description of the Instruction Set is performed (in examples where the NL descriptions are generated by at least one processor), the at least one processor which performs the generation can execute a robot-language conversion module which generates an NL description of each instruction in the Instruction Set, based on the respective instruction as expressed in robot-language. Similar to as discussed earlier, such a robot-language conversion module can comprise a text-string matching module operable to compare robot-language instructions in the Instruction Set to natural language vocabulary representative of actions performable by the robot system. Matching text strings can be identified for inclusion in the NL description of the Instruction Set. As an example, for the instruction "grasp (object)", the text-string matching module can identify "grasp" and "object" as corresponding to NL vocabulary. Further, the at least one processor can infer, based on general structure of programmatic functions, that the intent of this instruction is to cause a robot to "grasp" the input "object". To this end, the NL description "grasp object" can be generated for this instruction. As another example, for the instruction "place (object1, object2)", the text-string matching module can identify "place" and "object" as corresponding to NL vocabulary. Further, the at least one processor can infer, based on general structure of programmatic functions, that the intent of this instruction is to cause a robot to "place" the input "object1" on the input "object 2". To this end, the NL description "place object on object" can be generated for this instruction.

The NL request for a task plan generally refers to a statement or phrase intended to tell the LLM module what to do with the other information in the NL query. With reference to the example of kitting the chess set discussed above, the phrase "Here is a list of the above commands I should perform in order to complete my goal:". In the example, this phrase is intended to inform the LLM module that it is to generate a list of commands selected from the Instruction Set, in order to accomplish the stated goal (work objective, as discussed earlier). The NL request for a task plan can be generated, for example, by the at least one processor of the robot system based on a request template. As another example, the NL request can be included in an NL query template which is utilized to structure or format the first NL query, as discussed below.

In some implementations, at least one non-transitory processor-readable storage medium of the robot system stores at least one pre-generated NL template. Such an NL template can include any or all of respective template aspects for an NL description of at least one aspect of an environment, an NL description of a work objective, an NL description of an Instruction Set, and/or an NL request for a task plan. An exemplary template is discussed below, with reference to generation of the example prompt discussed earlier for kitting the chess set. However, other exemplary templates could be used, in different scenarios, to generate different NL queries. The discussed non-limiting exemplary NL template could be:

---

"There is [object_array_1] at [position_1] [(,)(and)] [object_array_2] at [position_2] . . . [and] [object_array_j] at [position_j]. My goal is to [work_objective]. I can only choose strictly from the following options:
1.) [reusable_work_primitive_1(variable)]
. . .
k.) [reusable_work primitive_k(variable)]
Where [variable] should be replaced with an appropriate object at [position_1] . . . [position_j]. Here is a list of the above actions I should perform in order to complete my goal:"

---

In the above template, elements in square brackets can be populated by the at least one processor inserting appropriate NL descriptions. In particular, object_array_1 represents at least one array of objects at position_1 (for example, an array of chess pieces on a table). In this example, the at least one processor can replace the text [object_array_1] with an NL description of the chess pieces, and the text [position_1] with an NL description of the table. Further in the example, object_array_2 represents a person standing at a position_2 opposite the robot body. In this example, the at least one processor can replace the text [object_array_2] with an NL description of the person, and the text [position_2] with an NL description of the person's position. Further, from the text [(,) (and)], the at least one processor can select either ",", or "and", to connect the text regarding object_array_1 and object_array_2 in a natural way (based on whether there is an object_array_3). In the example, there are no additional object arrays (no object_array_3 or object_array_j), so the at least one processor selects the connecting text "and". Further, because there are no additional object arrays, the at least one processor deletes or ignores (e.g. replaces with no text) the text "[object_array_j] at [position_j]".

As a result of the above steps, the first sentence of the first NL query as generated based on the template can be "There is white chess pawn number 1, white chess pawn number 2, black chess pawn number 1, black chess pawn number 2, a white chess rook, a black chess bishop and two blue bins at a table, and a person stood opposite me." This is similar to the exemplary prompt as discussed earlier, but for the chess pieces being described as being "at a table" instead of "on the table". To improve generation of the first NL query, the template can include options for transitional or locational words like "on" or "at", such that the at least one processor can select the most natural word for a given scenario.

Returning to the above template, the at least one processor can replace the text [work_objective] with an NL description of the work objective of the robot system. In the example, the at least one processor can replace the text [work_objective] such that the second sentence of the first NL query is "My goal is to do what the person says. The person says 'Put all the white pieces in the right bin and all the black pieces in the left bin'.", similar to the prompt in the example discussed earlier.

Further, the at least one processor can replace the text for the available instructions "1.) [reusable_work_primitive_1 (variable)] . . . k.) [reusable_work_primitive_k (variable)]" with NL descriptions of each available reusable work primitive. In the example scenario, the text for available instructions can be replaced with "1.) Grasp object", "2.) Place object on object", "3.) Look at object", "4.) Slice object", "5.) Say hello to the person", and "6.) Drop object in object", as in the exemplary prompt discussed earlier.

In the example, the "variable" for each reusable work primitive is replaced with appropriate text of "object" or "person", depending on what the given reusable work primitive is applicable to. Further, the text [variable] and [position_1] . . . [position_j] in the second to last sentence of the template are also replaced with appropriate text of "object", and relevant positions of the objects. In this regard, the second to last sentence of the generated NL query reads "Where object should be replaced with an appropriate object at the table", as in the exemplary prompt presented earlier.

In view of the above, by replacing or inputting select elements in a pre-generated template, an NL query is generated which is suitable for provision to an LLM module.

While the above describes the NL template as text where certain elements are "replaced" or "input", this is not strictly necessary in terms of implementation. For example, instead of "replacing" text in a literal sense, the NL template can also be implemented as a set of instructions or functions (e.g. a program or a script) which pieces base sentences together with relevant elements in a piece-wise manner. In such an example, the NL query is "assembled" as pieces instead of elements being literally "replaced". In this sense, the presented NL template is intended to be a logical representation of how elements can be pieced together, rather than a strict process by which text generation actually occurs.

Returning to method 300 in FIG. 3, at 308 the robot system receives the task plan from the LLM module. That is, after the LLM module is provided with the first NL query at 306, the LLM module generates the task plan (expressed in NL), and provides the generated task plan to the robot system.

As mentioned above, the task plan provided by the LLM module is expressed in NL. For example, the task plan can indicate at least one action performable by the robot system expressed in NL. In order for the robot system to execute or validate the action plan, the at least one processor can optionally first generate a robot-language task plan based on the task plan as expressed in NL. The robot-language task plan can comprise a set of robot control instructions which when executed by the at least one processor cause the robot system to perform the at least one action indicated in the task plan. For example, the set of robot control instructions can comprise a library or set of at least one reusable work primitive executable by the robot system. Further, the at least one action indicated in the task plan as expressed in NL can comprise an NL description of a particular reusable work primitive (e.g. grasp chess pawn 1), whereas the robot control instructions in the robot-language task plan can comprise actions of the NL task plan, but specified in a language format usable by the robot system (e.g. grasp (chess_pawn_54677)).

Similar to as described earlier, generating the robot-language task plan can comprise executing a robot-language conversion module which converts the at least one action performable by the robot system as expressed in NL to at least one reusable work primitive in the Instruction Set executable by the robot system. With reference to the example where the NL task plan includes an action expressed in NL as "grasp chess pawn 1", the robot-language conversion module can match text strings in the action as expressed in NL to text strings available in reusable work primitives usable by the robot system (e.g. grasp (object)), or objects in the environment with which the robot system can interact (e.g. chess_pawn_54677). As a result, the at least one processor can generate robot-language actions such as grasp (chess_pawn_54677).

In method 300, troubleshooting of the task plan is performed. For example, if a given task plan fails to execute (i.e., fails to be validated, fails to proceed through to completion, and/or fails to complete an intended task) or encounters an error or fault, a second NL query can be sent (back) to the LLM module optionally including all of the successful parts of the Task Plan executed or validated, with additional verbiage describing what failed and asking the LLM module what to do next. This is discussed below with reference to acts 310, 330, 332, 334, 336, and 338.

At 310, the at least one processor of the robot system determines whether the task plan includes at least one fault. This determination can be performed in many different ways, with some non-limiting exemplary implementations discussed below.

In a first implementation, act 310 entails executing at least one step of the task plan. For each step of the task plan which is executed, the at least one processor identifies whether execution of the respective step produces a fault scenario.

As one example, a fault scenario can comprise a scenario where execution of the step produces results which are not in alignment with the work objective. In an exemplary use case, where a work objective is for the robot system to win at chess, execution of a step where the robot system moves a King chess piece into checkmate is a fault scenario where results are produced which are not in alignment with the work objective. This is because moving the King piece into checkmate results in immediate loss of the chess game.

As another example, a fault scenario can comprise a scenario where execution of the step inhibits execution of at least one other step in the task plan. In an exemplary use case, execution of a step which results in breaking an object (e.g. a component of the robot, or an object which the robot needs to interact with) which is required for at least one other step in the task plan is a fault scenario where execution of at least one other step in the task plan is inhibited.

As yet another example, a fault scenario can comprise a scenario where execution of the step produces at least one unacceptable effect in the environment. In an exemplary use case, execution of a step which results in damage to the environment (even if said damage is not out of alignment with the work objective and does not inhibit other steps of the task plan) is a fault scenario where at least one unacceptable effect in the environment is produced. For example the robot body may strike a wall, leaving a hole, dent or other damage which is not acceptable, even if the integrity of the wall is not pertinent to achieving a work object of the robot system or performing other steps in the task plan.

In a second implementation, act 310 entails simulating execution of at least one step of the task plan. In an example, an environment model which represents the environment of the robot body is accessed. Such an environment model can be stored on at least one non-transitory processor-readable medium of the robot body, and/or generated or updated based on sensor data captured by at least one sensor of the robot body (e.g. data captured at 302). For example, an environment model can be populated by collecting data (e.g. haptic data or visual data) for individual objects. Based on the collected data, individual objects can be identified, and corresponding profiles for identified objects can be accessed in a database. The environment model is then populated with a visual and/or haptic representation of each individual object, based on the corresponding profile accessed for the respective object. Detailed implementations for generating and/or populating an environment model as discussed in U.S. Pat. No. 11,717,974, which is incorporated by reference herein in its entirety.

The at least one processor then simulates at least one step of the task plan in the environment model. For each step of the task plan where execution is simulated, the at least one processor identifies whether each step of the at least one step of the task plan, when execution of the respective step is simulated, produces a fault scenario.

Further, if no respective fault scenario is identified in simulation of each step of the at least one step of the task plan, the at least one processor can simulate at least one additional step of the task plan in the environment model. For each step of the at least one additional step of the task plan, when execution of the respective step is simulated, the at least one processor can identify whether each step of the at least one step of the task plan produces a respective fault scenario. In this way, a task plan can be evaluated in phases, with select steps of the task plan being simulated separately.

As one example, a fault scenario can comprise a scenario where simulated execution of the step produces simulated results which are not in alignment with the work objective. In an exemplary use case, where a work objective is for the robot system to win at chess, simulated execution of a step where the robot system moves a King chess piece into checkmate is a fault scenario where simulated results are produced which are not in alignment with the work objective. This is because moving the King piece into checkmate results in immediate loss of the chess game.

As another example, a fault scenario can comprise a scenario where simulated execution of the step inhibits execution of at least one other step in the task plan. In an exemplary use case, simulated execution of a step which results in simulated breakage of an object (e.g. a component of the robot, or an object which the robot needs to interact with) which is required for at least one other step in the task plan is a fault scenario where execution of at least one other step in the task plan is inhibited.

As yet another example, a fault scenario can comprise a scenario where simulated execution of the step produces at least one unacceptable simulated effect in the environment. In an exemplary use case, simulated execution of a step which results in simulated damage to the environment (even if said damage is not out of alignment with the work object and does not inhibit other steps of the task plan) is a fault scenario where at least one unacceptable effect in the environment is produced. For example, the robot body may be simulated to strike a wall, leaving a hole, dent or other damage which is not acceptable, even if the integrity of the wall is not pertinent to achieving a work object of the robot system or performing other steps in the task plan.

By simulating execution of at least one step of the task plan, efficiency can be improved by avoiding wasting energy or time actually executing a faulty task plan. Further, actual damage to objects can be avoided in cases where a task plan would result in such damage.

In a third implementation, act 310 can comprise determining whether the task plan violates at least one rule in a set of rules specified in at least part of a reasoning engine. In some examples, the at least one processor of the robot system validates the task plan with the reasoning engine (based on reasoning engine data stored on at least one non-transitory processor-readable storage medium of the robot system). In some implementations, the reasoning engine can be external, and the robot system can send the task plan to a device where the reasoning engine is stored and executed (e.g. a server or peripheral device), for validation.

According to the reasoning engine or other logic-based system, the task plan can be reviewed or validated, and approved or rejected for some reason or plurality of reasons. The logic-based system or reasoning engine could be the CYC® machine reasoning AI platform from Cycorp Inc., as a non-limiting example. Reasoning engines (sometimes called inference engines) can utilize a library of logical rules, statements, terms, pieces of knowledge, or similar, and can make logical conclusions based on the same. In this way, a task plan as referenced in method 300 can be validated by a reasoning engine, by comparing the task plan to a set of rules (or similar) specified at least in part of a reasoning engine. That is, at least a part of the logic of a reasoning engine can be applied to a task plan to validate whether the task plan makes logical sense, and/or to identify any logical inconsistencies or impossibilities in the task plan. A reason for rejecting could be, for example, a safety violation in relation to robot safety or safety of any human or other living being. In the event of a rejection, a second NL query could be sent back to the LLM module as in act 334 discussed later to prevent a task plan from failing the external check.

If at 310 the task plan is determined as not including at least one fault, method 300 proceeds to 320. At 320, the task plan is executed to completion by the robot system. In implementations where at least one step is executed at 310, act 320 comprises executing remaining steps of the task plan. In some implementations, act 320 can be a passive result of determining whether the task plan includes at least one fault by executing each step of the task plan. That is, if each step of the task plan is executed to determine if the task plan includes any faults, then act 320 comprises completion of execution of the task plan without any faults.

In implementations where the execution of the task plan is simulated, or identification of faults is performed by a logic or reasoning engine (instead of actually executing acts of the task plan), act 320 comprises executing the task plan (which has already been determined as not including any faults).

If at 310 the task plan is determined as including at least one fault, method 300 proceeds to 330.

At 330, the at least one processor generates an NL description of the at least one fault. Optionally, at 332, the at least one processor generates an NL description of any steps of the task plan which do not include faults. Examples of acts 330 and 332 are discussed later with reference to DIALOGUES 1 through 6.

At 334, a second NL query is provided to the LLM module. The second NL query includes at least the NL description of the at least one fault and an NL request for a resolution plan. At 336, the resolution plan is received from the LLM module. The resolution plan is expressed in NL, and includes information and or steps for resolving the at least one fault in the task plan. Examples of acts 334 and 336 are discussed later with reference to DIALOGUES 1 through 6.

DIALOGUE 2 is discussed below. DIALOGUE 2 follows DIALOGUE 1 discussed earlier, and is an example dialogue where a fault is identified in the task plan provided in RESPONSE 1 of DIALOGUE 1. DIALOGUE 2 illustrates an exemplary second query, QUERY 2, provided to an LLM in accordance with act 334. DIALOGUE 2 also includes a response, RESPONSE 2, which includes a resolution plan in accordance with act 336. In the example of DIALOGUE 2, steps of the task plan were actually executed by the robot system, until a fault is identified.

DIALOGUE 2
QUERY 2:
Step 1 executed successfully.
In executing Step 2, the right bin was knocked to the floor.
Steps 3 through 12 were not executed.
Please provide a resolution plan.
RESPONSE 2:
Step A: Place white chess pawn number 1 on table
Step B: Look at floor to identify right bin and any chess pieces on floor
Step C: Grasp right bin in one hand
Step D: For each chess piece on floor:
　Step D1: Grasp chess piece in another hand
　Step D2: Place chess piece in right bin
Step E: Place right bin on table
Step F: Resume task plan from Step 2. During each of Steps 2, 4, and 10 grasp right bin with free hand. During each of Steps 6, 8, and 12 grasp left bin with free hand In the example of DIALOGUE 2, the NL description of at least one fault as generated in act 330 is "In executing Step 2, the right bin was knocked to the floor." This fault represents not only an undesirable situation, but also a situation where the task plan as originally generated in DIALOGUE 1 cannot be completed. Further, the NL description of any steps of the task plan which do not include faults generated in act 332 is "Step 1 executed successfully." This description is optional, in that successful completion of Step 1 is implied by virtue of Step 2 being executed.

In QUERY 2, the NL descriptions generated at 330 and 332 are assembled as the second query in act 334, with the statement "Please provide a resolution plan." being an NL request for a resolution plan. RESPONSE 2 is generated by the LLM module as the resolution plan, and is received from the LLM module.

In the example of DIALOGUE 2, because the task plan was actually executed, and a fault occurred (knocking the right bin to the floor), the resolution plan provided in RESPONSE 2 not only revises the original task plan, but includes steps for addressing consequences of the fault (in this case, cleaning up the right bin and any chess pieces which fell onto the floor in Steps A, B, C, D, D1, D2, and E).

In the illustrated example, the resolution plan is additional steps to the original task plan, and the original task plan is referenced in the resolution plan in Step F. That is, the resolution plan itself is not a complete task plan (in the illustrated example), but rather includes steps which correct the fault in the task plan. In particular, after cleaning up the consequences of the right bin being knocked to the floor, the resolution plan instructs the robot system to resume the task plan in the statement "Resume task plan from Step 2." Further, the resolution plan provides additional instructions for avoiding the fault (or similar faults) as seen during execution of Step 2. In particular, the resolution plan states "During each of Steps 2, 4, and 10 grasp right bin with free hand. During each of Steps 6, 8, and 12, grasp left bin with free hand." In this way, the resolution plan modifies the original task plan such that the robot system stabilizes the right bin and the left bin when placing pieces therein, to reduce the risk that the right bin and left bin are knocked to the floor.

In alternative implementations, the resolution plan can comprise an entirely new task plan, as shown in DIALOGUE 3 below. DIALOGUE 3 follows DIALOGUE 1 discussed earlier, and is an example dialogue where a fault is identified in the task plan provided in RESPONSE 1 of DIALOGUE 1. DIALOGUE 3 illustrates an exemplary second query, QUERY 3, provided to an LLM in accordance with act 334. DIALOGUE 3 also includes a response, RESPONSE 3, which includes a resolution plan in accordance with act 336. In the example of DIALOGUE 3, steps of the task plan were actually executed by the robot system, until a fault is identified.

DIALOGUE 3
QUERY 3:
Step 1 executed successfully.
In executing Step 2, the right bin was knocked to the floor.
Steps 3 through 12 were not executed.
Please provide a resolution plan.
RESPONSE 3:
Step 1: Place white chess pawn number 1 on table
Step 2: Look at floor to identify right bin and any chess pieces on floor
Step 3: Grasp right bin in one hand
Step 4: For each chess piece on floor:
　Step 4A: Grasp chess piece in another hand
　Step 4B: Place chess piece in right bin
Step 5: Place right bin on table
Step 6. Grasp white chess pawn number 1
Step 7: Grasp right bin with free hand
Step 8. Place white chess pawn number 1 in right bin
Step 9. Grasp white chess pawn number 2
Step 10. Place white chess pawn number 2 in right bin
Step 11. Cease grasping right bin
Step 12. Grasp black chess pawn number 1
Step 13. Grasp left bin with free hand
Step 14. Place black chess pawn number 1 in left bin
Step 15. Grasp black chess pawn number 2
Step 16. Place black chess pawn number 2 in left bin
Step 17. Cease grasping left bin
Step 18. Grasp white chess rook
Step 19: Grasp right bin with free hand
Step 20. Place white chess rook in right bin
Step 21. Cease grasping right bin
Step 22. Grasp black chess bishop
Step 23: Grasp left bin with free hand
Step 24. Place black chess bishop in left bin
Step 25. Cease grasping left bin QUERY 3 in DIALOGUE 3 is similar to QUERY 2 in DIALOGUE 2. Description of QUERY 2 is fully applicable to QUERY 3, and is not repeated for brevity.

In the example of DIALOGUE 3, because the task plan was actually executed, and a fault occurred (knocking the right bin to the floor), the resolution plan provided in RESPONSE 3 includes steps for addressing consequences of the fault (in this case, cleaning up the right bin and any chess pieces which fell onto the floor in Steps 1, 2, 3, 4, 4A, 4B, and 5).

In the illustrated example of DIALOGUE 3, the resolution plan replaces the original task plan. That is, the robot system can complete the task by executing the resolution plan, without needing to continue to perform the original task plan. The resolution plan provides additional instructions for avoiding the fault (or similar faults) as seen during execution of original Step 2 in the original task plan. In particular, in Steps 7 and 19 the right bin is grasped to prevent it being knocked to the floor during Steps 8, 9, 10, and 20. Likewise, in Steps 13 and 23 the left bin is grasped to prevent it being knocked to the floor during Steps 14, 15, 16, and 24.

DIALOGUE 4 is discussed below. DIALOGUE 4 follows DIALOGUE 1 discussed earlier, and is an example dialogue where a fault is identified in the task plan provided in RESPONSE 1 of DIALOGUE 1. DIALOGUE 4 illustrates an exemplary second query, QUERY 4, provided to an LLM in accordance with act 334. DIALOGUE 4 also includes a response, RESPONSE 4, which includes a resolution plan in accordance with act 336. In the example of DIALOGUE 4, steps of the task plan were simulated by the robot system (instead of actually being executed), to identify any faults in the task plan.

DIALOGUE 4
QUERY 4:
Simulation indicates execution of Steps 1, 3, 5, 6, 7, 8, 9, 11, and 12 will be successful.
Simulation indicates that in Step 2, the right bin will be knocked to the floor.
Simulation indicates that Steps 4 and 10 cannot be executed, because the right bin is displaced.
Please provide a resolution plan.
RESPONSE 4:
During each of Steps 2, 4, and 10, grasp right bin with free hand.

In the example of DIALOGUE 4, the NL description of at least one fault as generated in act 330 is "Simulation indicates that in Step 2, the right bin will be knocked to the floor. Simulation indicates that Steps 4 and 10 cannot be executed, because the right bin is displaced." These faults represent not only an undesirable situation, but also a situation where the task plan as originally generated in DIALOGUE 1 cannot be completed. Further, the NL description of any steps of the task plan which do not include faults generated in act 332 is "Simulation indicates execution of Steps 1, 3, 5, 6, 7, 8, 9, 11, and 12 will be successful." This description is optional, in that successful completion of Steps 1, 3, 5, 6, 7, 8, 9, 11, and 12 is implied by virtue of no faults being reported for these steps.

In QUERY 4, the NL descriptions generated at 330 and 332 are assembled as the second query in act 334, with the statement "Please provide a resolution plan." being an NL request for a resolution plan. RESPONSE 4 is generated by the LLM module as the resolution plan, and is received from the LLM module.

In the example of DIALOGUE 4, the resolution plan is additional steps or information to the original task plan, and the original task plan is referenced in the resolution plan. That is, the resolution plan itself is not a complete task plan (in the illustrated example), but rather includes steps which correct the fault in the task plan. In particular, the resolution plan states "During each of Steps 2, 4, and 10, grasp right bin with free hand." In this way, the resolution plan modifies the original task plan such that the robot system stabilizes the right bin when placing pieces therein, to reduce the risk that the right bin is knocked to the floor in Step 2 and displaced in Steps 4 and 10. Since no faults were reported in QUERY 4 for steps where chess pieces are placed in the left bin, it is not necessary to grasp the left bin during steps 6, 8, and 12. In an abundance of caution, the resolution plan could however instruct the robot system to grasp the left bin during steps 6, 8, and 12, if desired.

In alternative implementations, the resolution plan can comprise an entirely new task plan, similar to as discussed above regarding DIALOGUE 3, and not repeated for brevity.

Exemplary DIALOGUES 5 and 6 are discussed below, where act 310 of method 300 is performed by a verification tool such as a logic-based system (e.g. a reasoning engine as discussed earlier). For DIALOGUES 5 and 6, respective exemplary Task Plans a and B are shown, and can be generated and received as described in acts 306 and 308 discussed earlier, and not repeated for brevity (e.g. Task Plans a and B could be generated and received in response to QUERY 1 in DIALOGUE 1 as discussed earlier, or any other similar query).

Task Plan α is pertinent to the Example of DIALOGUE 5, and is as follows.
Task Plan α:
Step 1. Grasp white chess pawn number 1
Step 2. Place white chess pawn number 1 in white chess rook
Step 3. Grasp white chess pawn number 2
Step 4. Place white chess pawn number 2 in white chess rook
Step 5. Grasp white chess pawn 1, white chess pawn 2, and white chess rook
Step 6. Place white chess pawn 1, white chess pawn 2, and white chess rook in right bin
Step 7. Grasp black chess pawn number 1
Step 8. Place black chess pawn number 1 in black chess bishop
Step 9. Grasp black chess pawn number 2
Step 10. Place black chess pawn number 2 in black chess bishop
Step 11. Grasp black chess pawn 1, black chess pawn 2, and black chess bishop
Step 12. Place black chess pawn 1, black chess pawn 2, and black chess bishop in left bin To summarize Task Plan α, the robot is expected to merge all of the white chess pieces together (by placing white chess pawns 1 and 2 into the white chess rook), and then put the merged white chess pieces into the right bin. Similarly, the robot is expected to merge all of the black chess pieces together (by placing black chess pawns 1 and 2 into the black chess bishop), and then put the merged black chess pieces into the left bin. In act 310, the validation tool can recognize this strategy as faulty in act 310, in that chess pieces are generally solid and cannot simply be put in each other. This can be handled as shown in DIALOGUE 5 below.

DIALOGUE 5:
QUERY 5A:
Steps 2, 4, 8, and 10 cannot be executed. Chess pieces are solid matter, and other chess pieces cannot be placed within. Please provide a resolution plan.
RESPONSE 5A:
Step A. Slice white chess rook
Step B. Slice black chess bishop
Step C. Proceed with original task plan Steps 1 through 12.

QUERY 5B:
Slicing chess pieces destroys them. Please provide a resolution plan which does not include slicing chess pieces.

RESPONSE 5B:
Execute the following updated task plan:
Step 1. Grasp white chess pawn number 1
Step 2. Place white chess pawn number 1 in right bin
Step 3. Grasp white chess pawn number 2
Step 4. Place white chess pawn number 2 in right bin
Step 5. Grasp black chess pawn number 1
Step 6. Place black chess pawn number 1 in left bin
Step 7. Grasp black chess pawn number 2
Step 8. Place black chess pawn number 2 in left bin
Step 9. Grasp white chess rook
Step 10. Place white chess rook in right bin
Step 11. Grasp black chess bishop
Step 12. Place black chess bishop in left bin For QUERY 5A, an NL description of the at least one fault is generated in accordance with act 330, which in this example is the statement "Steps 2, 4, 8, and 10 cannot be executed. Chess pieces are solid matter, and other chess pieces cannot be placed within." This is parsed with a NL request for resolution plan, "Please provide a resolution plan.", and provided to the LLM module as a second NL query in accordance with act 334 of method 300.

RESPONSE 5A corresponds to the resolution plan received at 336. In this example, the LLM module has generated a resolution plan (an updated task plan) where the white chess rook and the black chess bishop are sliced. In this way, the LLM module may intend to create space within the white chess rook and the black chess bishop to hold the other chess pieces. The validation tool can again identify that this updated task plan includes at least one fault in act 310.

An NL description of the at least one fault can be generated (in this example the statement "Slicing chess pieces destroys them.") in accordance with act 330 of method 300. This is parsed with a request for resolution plan (in this example the statement "Please provide a resolution plan which does not include slicing chess pieces."), and provided to the LLM module as another second NL query (QUERY 5B) in accordance with act 334 of method 300.

RESPONSE 5B is received from the LLM module, and includes a resolution plan which is an entirely new task plan. This task plan is substantially similar to that provided in RESPONSE 1 of DIALOGUE 1, and the details thereof are not repeated for brevity. In this example, the validation tool can determine at 310 that there are not faults with the updated task plan provided in RESPONSE 5B, and method 300 proceeds to act 320 where the updated task plan is executed to completion.

The example of DIALOGUE 5 illustrates an important concept optionally applicable to any appropriate implementation of method 300 (and any of the examples discussed herein): method 300 can be iterative or recursive, such that a received resolution plan (or updated task plan based thereon) can be tested for faults in accordance with act 310. Task Plan β is pertinent to the Example of DIALOGUE 6, and is as follows.

Task Plan β:
Step 1. Grasp white chess pawn number 1
Step 2. Place white chess pawn number 1 on white chess rook
Step 3. Grasp white chess pawn number 2
Step 4. Place white chess pawn number 2 on white chess rook
Step 5. Grasp right bin
Step 6. Place right bin on white chess pawn 1, white chess pawn 2, and white chess rook
Step 7. Grasp black chess pawn number 1
Step 8. Place black chess pawn number 1 on black chess bishop
Step 9. Grasp black chess pawn number 2
Step 10. Place black chess pawn number 2 on black chess bishop
Step 11. Grasp left bin
Step 12. Place left bin on black chess pawn 1, black chess pawn 2, and black chess bishop To summarize Task Plan β, the robot is expected to collect all of the white chess pieces together (by placing white chess pawns 1 and 2 on the white chess rook), and then put the right bin on the collected white chess pieces. Similarly, the robot is expected to collect all of the black chess pieces together (by placing black chess pawns 1 and 2 on the black chess bishop), and then put the left bin on the collected black chess pieces. In act 310, the validation tool can recognize this strategy as faulty in act 310, in that putting the bins "on" the chess pieces is not equivalent to putting the chess pieces in the bins (in that the bins are intended to hold the chess pieces together for easy movement as a collective). This can be handled as shown in DIALOGUE 6 below.

DIALOGUE 6
QUERY 6:
Placing a bin on chess pieces does not result in the chess pieces being in the bin in a useful capacity. Please provide a resolution plan where the chess pieces are in the bins such that movement of the bins moves the chess pieces therein.

RESPONSE 6:
Execute the following updated task plan:
Step 1. Grasp white chess pawn number 1
Step 2. Place white chess pawn number 1 in right bin
Step 3. Grasp white chess pawn number 2
Step 4. Place white chess pawn number 2 in right bin
Step 5. Grasp black chess pawn number 1
Step 6. Place black chess pawn number 1 in left bin
Step 7. Grasp black chess pawn number 2
Step 8. Place black chess pawn number 2 in left bin
Step 9. Grasp white chess rook
Step 10. Place white chess rook in right bin
Step 11. Grasp black chess bishop
Step 12. Place black chess bishop in left bin For QUERY 6, an NL description of the at least one fault is generated in accordance with act 330, which in this example is the statement "Placing a bin on chess pieces does not result in the chess pieces being in the bin in a useful capacity." This is parsed with a NL request for resolution plan, "Please provide a resolution plan where the chess pieces are in the bins such that movement of the bins moves the chess pieces therein.", and provided to the LLM module as a second NL query in accordance with act 334 of method 300.

RESPONSE 6 is received from the LLM module, and includes a resolution plan which is an entirely new task plan. This task plan is substantially similar to that provided in RESPONSE 1 of DIALOGUE 1, and the details thereof are not repeated for brevity. In this example, the validation tool can determine at 310 that there are no faults with the updated task plan provided in RESPONSE 5, and method 300 proceeds to act 320 where the updated task plan is executed to completion.

The resolution plans discussed herein can include NL descriptions of any appropriate modifications or replacements to the task plan. As an example, the resolution plan can include adjustment to order of steps in the task plan (e.g. if one step puts the robot system in a configuration which inhibits an otherwise unrelated future step, the order of said steps can be changed). As another example, the resolution plan can include adjustment to success criteria for any steps in the task plan (e.g. in the example of kitting a chess set, if a bin is full, success criteria can be changed to putting a chess piece on top of other chess pieces in the bin, or putting chess pieces in another bin if available). As yet another example, the resolution plan can include adjustment to any actions expressed in any steps of the task plan (such as the adjustments discussed with reference to DIALOGUES 2, 4, and 5). As yet another example, the resolution plan can include adjustments to any targets of interaction for any steps of the task plan (e.g. if a step would cause the robot system to drop a large object, the resolution plan can cause the robot system to attempt to grasp the object at a different location such as a handle). As yet another example, the resolution plan can include replacement of any steps of the task plan with at least one new step. As yet another example, the resolution plan can include removal of at least one step of the task plan. As yet another example, the resolution plan can include an updated task plan to replace all steps of the task plan (as discussed above regarding DIALOGUES 3, 5, and 6).

Returning to method 300 in FIG. 3, at 338, the robot system executes an updated task plan. The updated task plan is based at least in part on the resolution plan.

In some implementations, an LLM may help to autonomously assign parameters or definitions to generalized and/or parameterized objects in a robot control system. For example, parameterized work primitives or "Instructions" can be assigned by the LLM as in the case of the chess kitting example above. As another example, if a task plan successfully executes, the successful task plan can be stored and then re-parameterized to become generalized. When the robot encounters a future instance of a similar task, it can recall the stored successful task plan and ask the LLM module (e.g., via a simple NL prompt) to replace the parameterized objects from the previously successful instance of the task plan with new objects specific to the current instance of the task plan. For example, if a plan was generated to successfully sort two types of specific object, a robot can re-use it by asking the LLM to replace those objects with different objects.

Various implementations of the present systems, methods, control modules, and computer program products involve using NL expressions (descriptions) (e.g., via a NL prompt, which may be entered directly in text by a user or may be spoken vocally by a user and converted to text by an intervening voice-to-text system) to control functions and operations of a robot, where an LLM module may provide an interface between the NL expressions and the robot control system. This framework can be particularly advantageous when certain elements of the robot control architecture employ programming and/or instructions that can be expressed in NL. A suitable, but non-limiting, example of this is the aforementioned Instruction Set. For example, as mentioned earlier, a task plan output of an LLM module can be parsed (e.g., autonomously by the robot control system) by looking for a word match to Instruction Set commands, and the arguments of the Instruction Set can be found by string matching within the input NL prompt (e.g. by a text-string matching module as discussed earlier). In some implementations, a 1-1 map may be generated between the arguments used in the robot control system and NL variants, in order to increase the chance of the LLM module processing the text properly. For example, even though an object is represented in the robot control system (e.g., in a world model environment portion of the robot control system) as chess_pawn_54677, it may be referred to in the NL prompt as "chess pawn 1". In this case, if the returned task plan contains the phrase "grasp chess pawn 1", this may be matched to Instruction Set "grasp" and the object "chess pawn 1" so the phrase may be mapped to grasp (chess_pawn_54677). Such parsing and/or word matching (e.g. the text-string matching module) can be employed in any of the situations discussed herein where robot language is converted to natural language or vice-versa.

In some implementations, a robot control system may generate and/or employ a scene graph describing the robot's environment, and a function may be applied to act on the scene graph and creates an NL prompt or description describing the scene from the robot's perspective (e.g. in the context of act 304 of method 300). This auto-generated NL prompt or description may then be used as an input into an LLM module in order to facilitate various operations, such as reasoning, fact-checking, and task planning.

In some implementations, the quality of a task plan may depend, at least in part, on the robot's knowledge of its environment, so the robot control system may regularly check and compare its Scene Graph and Inner World Model in the background. In accordance with the present systems, methods, control modules and computer program products, this checking and comparing the scene graph (e.g., actual data from the robot's external environment) and inner world model (e.g., robot's simulation of its external environment) can be done by automatically generated NL prompts or descriptions of each and feeding these NL prompts or descriptions through an LLM module.

In some implementations, a LLM module used as a task planner may be engaged frequently by a robot control system to answer the question "what could I (the robot) do here/now?". For example, the robot control may automatically generate an NL description of at least one aspect of its environment (scene graph) and capabilities (Instruction Set) and feed these NL descriptions into the LLM module along with the query: What can I do?: or "What should I do?": (or similar variations, such as "What would be the most useful thing for me to do", "What is a productive thing that I could do?", etc.) A set of answers to this or similar questions can each then be run through generation of task plans (e.g., as described above with reference to method 300 in FIG. 3) to achieve each of these goals. Each of these task plans can be checked for faults as in act 310 of method 300 (e.g. validation by a reasoning engine), and the tasks that pass are now a set of things the robot system could spontaneously do without being asked. This type of behavior is a type of agency, in that embodied artificial general intelligence (AGI) utilized by the robot system is creating its own grounded task plans and then executing them. In some implementations, the robot system presents an output describing what it is planning to do in NL, to ask a person (or pilot/supervisor) permission to execute the plan. A separate reasoning system such as Cyc® may be used to explain each step in the plan. The plans may be provided at any desired level of abstraction, where the highest level is likely the most useful descriptor for a human supervisor to ascertain whether the plan should be executed. The LLM module may also be used to check whether the plan passes some criteria, for example by issuing a NL prompt to ask whether the highest level plan is compatible with a series of desired constraints.

Some task plans may contain steps that cannot be resolved to Instruction Set elements and are inherently computational. For example, a task plan may require the computation of an integral, or some other computational process, that might not be possible given a particular Instruction Set. In these cases, the robot system can send these task plan steps to an LLM-based system or LLM module that asks for the generation of a piece of code, for example a python script, that generates a function to execute the task. In some implementations, that script can then live in a "code repository" where human engineers look at all the auto-generated scripts generated by the background "what could I do here?" process, and check that they do what is intended. Such scripts generated by an LLM-based device or module can provide new Instruction Set elements that can be called to "unlock" task plans that were blocked by not having access to an appropriate instruction, or can be otherwise accessible to the robot system for incorporation and use in task plans.

Figure 4B:
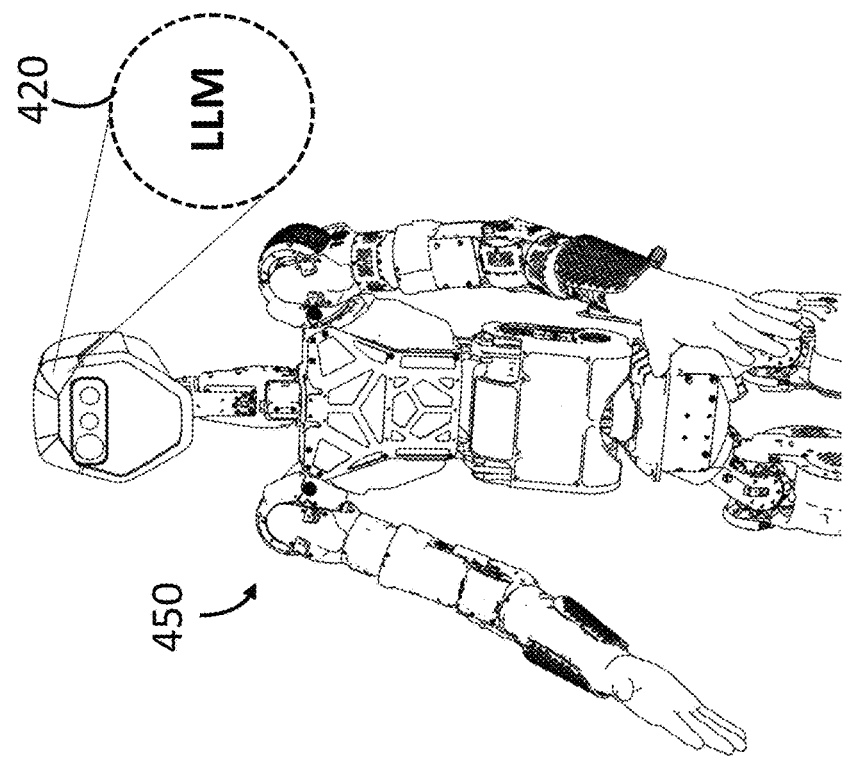
FIG. 4B is an illustrative diagram of an exemplary implementation of a robot with access to an LLM in which the LLM is stored and executed locally on-board the robot as an integral part of the robot's control system in accordance with the present systems, control modules, methods, and computer program products.
Figure 4A:
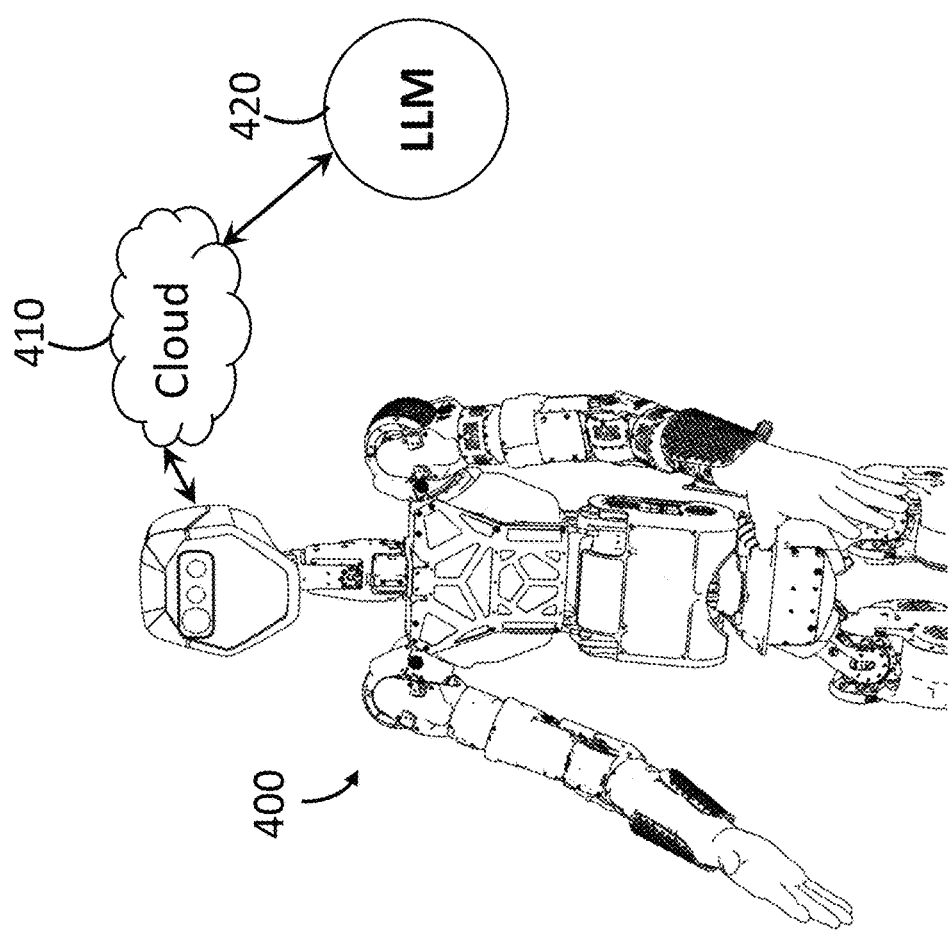
FIG. 4A is an illustrative diagram of an exemplary implementation of a robot with access to an LLM in which the LLM is stored and executed outside of the robot (e.g., in the cloud) and called or accessed by a robot control system in accordance with the present systems, control modules, methods, and computer program products

In some implementations, an LLM module may be stored and executed outside of a robot (e.g., in the cloud) and called or accessed by a robot system (as illustrated in the example of FIG. 4A). In particular, FIG. 4A is a schematic view of a robot body 400, which accesses an LLM module 420 via a cloud 410 (such that LLM module is separate from a robot system which includes robot body 400). In other implementations, an LLM module may be stored and executed locally on-board a robot system as an integral part of the robot's control system (as illustrated in the example of FIG. 4B). In particular, FIG. 4B is a schematic view of a robot body 450, having an LLM module 420 locally at a non-transitory processor-readable storage medium of robot body 450. Both implementations are referred to herein as a "robot with access to an LLM".

The various implementations described herein include systems, methods, control modules, and computer program products for leveraging one or more LLM(s) in a robot control system, including for example establishing an NL interface between the LLM(s) and the robot control system and calling the LLM(s) to help autonomously instruct the robot what to do. Example applications of this approach include task planning, motion planning, reasoning about the robot's environment (e.g., "what could I do now?"), and so on. Such implementations are particularly well-suited in robot control systems for which at least some control parameters and/or instructions (e.g., the Instruction Set described previously) are amenable to being specified in NL. Thus, some implementations may include converting or translating robot control instructions and/or parameters into NL for communicating such with the LLM(s) via the NL interface.

Figure 5:
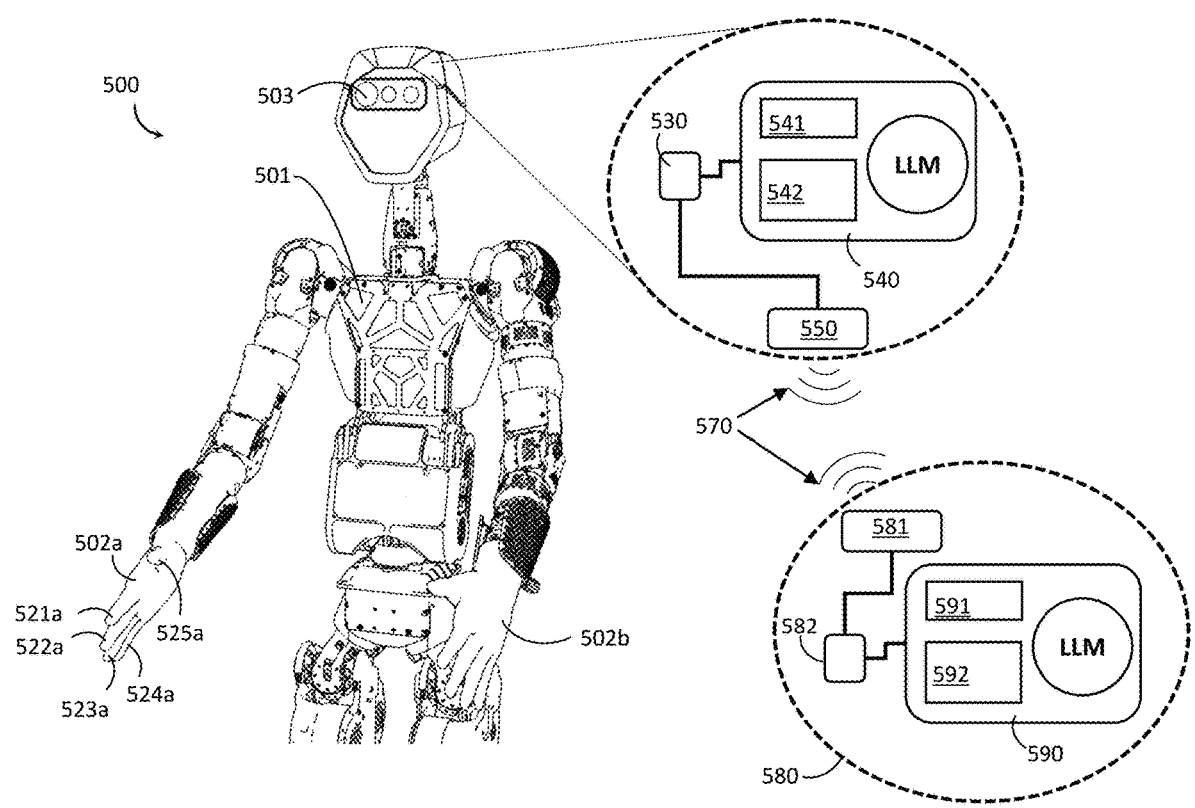
FIG. 5 is an illustrative diagram of an exemplary robot system comprising various features and components described throughout the present systems, control modules, methods and computer program products.

FIG. 5 is an illustrative diagram of an exemplary robot system 500 comprising various features and components described throughout the present systems, robots, methods, control modules, and computer program products. For example, robot system 500 can perform method 300 and associated acts as discussed earlier (and not repeated for brevity). Robot system 500 comprises a robot body 501 with a first physically actuatable component 502a and a second physically actuatable component 502b mechanically coupled to body 501. In the illustrated implementation, first and second physically actuatable components 502a and 502b each correspond to a respective robotic hand, though a person of skill in the art will appreciate that in alternative implementations a physically actuatable component may take on other forms (such as an arm or leg, a non-hand-like end effector such as a cutter or suction tube, or any other form useful to the particular applications the robot is intended to perform). Robotic hand 502a emulates a human hand and includes multiple fingers 521a, 522a, 523a, and 524a and an opposable thumb 525a. Robotic hand 502b is similar to a mirror-image of robotic hand 502a while corresponding details are not labeled for robotic hand 502b to reduce clutter. Robotic hands 502a and 502b may be physically actuatable by a variety of different means, including electromechanical actuation, cable-driven actuation, magnetorheological fluid-based actuation, and/or hydraulic actuation. Some exemplary details of actuation technology that may be employed to physically actuate robotic hands 502a and 502b are described in U.S. patent application Ser. No. 17/491,577 and U.S. patent application Ser. No. 17/749,536, both of which are incorporated by reference herein in their entirety.

Robot body 501 further includes at least one sensor 503 that detects and/or collects data about the environment and/or objects (e.g., including people, such as customers) in the environment of robot system 500. In the illustrated implementation, sensor 503 corresponds to a sensor system including a camera, a microphone, and an initial measurement unit that itself comprises three orthogonal accelerometers, a magnetometer, and a compass. However, any appropriate sensor could be included or excluded in the at least one sensor 503, as appropriate for a given application. Sensor data such as captured in act 302 of method 300 can be captured for example by sensor 503.

For the purposes of illustration, FIG. 5 includes details of certain exemplary components that are carried by or within robot body 501 in accordance with the present systems, robots, methods, control modules, and computer program products. Such components include at least one processor 530 and at least one non-transitory processor-readable storage medium, or "memory", 540 communicatively coupled to processor 530. Memory 540 stores data 541 and processor-executable instructions 542 (e.g., together as a robot control module or computer program product) that, when executed by processor 530, cause robot body 501 (including applicable actuatable components such as either or both of robotics hands 502a and/or 502b) to perform actions and/or functions in association with the present systems, methods, control modules and computer program products. The at least one processor 530 and the at least one non-transitory processor-readable storage medium 540 together can be considered as a robot controller.

In some implementations, actions or processes can be performed entirely locally at robot body 501. For example, in some implementations the entirety of method 300 can be performed locally at robot body 501. In such implementations, the at least one sensor 503 captures the sensor data in act 302, and the at least one processor 530 generates the NL description of the at least one aspect of the environment in act 304. The at least one processor 530 can further generate any of the other NL descriptions included in the first NL query as discussed earlier. Further in such implementations, memory 540 also stores an LLM module, to which the first NL query is provided in act 306. Providing the first NL query in such cases can refer to the at least one processor 530 executing the LLM module, with the first NL query as input. Further, receiving the task plan from the LLM module as in act 308 of method 300 can comprise the at least one processor 530 receiving the task plan as output by the LLM module. Further still, determining whether the task plan includes at least one fault as in act 310 is performed by the at least one processor 530 (e.g. by causing the robot system to perform steps in the task plan, simulating execution of the task plan, or running a verification tool such as a reasoning engine, as discussed earlier). Executing the task plan to completion as in act 320 comprises the at least one processor 530 executing instructions which cause robot body 501 to perform actions specified in the task plan. Generating NL descriptions such as in acts 330 and 332 is performed by the at least one processor 530. Providing the second NL query to the LLM module as in act 334 in such cases can refer to the at least one processor 530 executing the LLM module, with the second NL query as input. Further, receiving the resolution plan from the LLM module as in act 336 of method 300 can comprise the at least one processor 530 receiving the resolution plan as output by the LLM module. Executing the updated task plan as in act 338 comprises the at least one processor 530 executing instructions which cause robot body 501 to perform actions specified in the updated task plan, or the at least one processor 530 updating the task plan based on the resolution plan then executing the updated task plan.

In some implementations, actions or processes can be performed either locally at robot body 501, or separately by a device separate from the robot body 501. In this regard, the at least one processor 530 is also communicatively coupled to a wireless transceiver 550 via which robot body 501 sends and receives wireless communication signals 570.

FIG. 5 also includes a separate device 580 which is part of robot system 500, but is physically separate from robot body 501. As non-limiting examples, separate device 580 could be a processing unit in close vicinity (e.g. in the same room) as robot body 501, or separate device 580 could be a remote server from robot body 501. Separate device 580 includes a wireless transceiver 581 via which separate device 580 sends and receives wireless communication signals 570. Wireless transceiver 550 and wireless transceiver 581 can be referred to as a communication interface (together or separately) by which robot body 501 and separate device 580 communicate. Further, transceivers 550 and 581 do not have to be in direct communication (though they can be); for example, transceivers 550 and 581 may communicate with each other via a network or the internet. Further still, transceivers 550 and 581 do not have to be wireless; in some implementations either transceiver could be replaced with a wired communication interface. In some implementations where the LLM module is not stored in memory 540, robot body 501 may access the LLM module through transceivers 550 and 581 via wireless signals 570.

In particular, separate device 580 is also illustrated as including at least one processor 582 communicatively coupled to wireless transceiver 581, and at least one non-transitory processor-readable storage medium 590 (or "memory" 590) communicatively coupled to the at least one processor 582. Memory 590 stores data 591 and processor-executable instructions 592 (e.g., together as a robot control module or computer program product) that, when executed by processor 582, cause separate device 580 (or components thereof) to perform actions and/or functions in association with the present systems, robots, methods, robot control modules, and computer program products. Memory 590 can also store an LLM module. Alternatively, separate device 580 can access an LLM module stored at yet another device (e.g. a cloud or internet based LLM module).

Methods or processes discussed herein (e.g. method 300 in FIG. 3) can be performed by a combination of robot body 501 and separate device 580. In an exemplary implementation, the at least one sensor 503 captures the sensor data in act 302, and the at least one processor 530 generates the NL description of the at least one aspect of the environment in act 304. The at least one processor 530 can further generate any of the other NL descriptions included in the first NL query as discussed earlier. In this exemplary implementation, memory 590 of separate device 580 stores an LLM module, to which the first NL query is provided in act 306. Providing the first NL query in this example refers to the robot body 501 transmitting the first NL query to the separate device via transceivers 550 and 581 (communication interface). The at least one processor 582 then executes the LLM module with the first NL query as input.

In some cases, receiving the task plan from the NL as in act 308 of method 300 comprises the robot body 501 receiving the task plan output by the LLM module, transmitted from separate device 580 by transceivers 550 and 581, to be received by the robot controller (or the at least one processor 530). Determining whether the task plan includes at least one fault as in act 310 is performed by the at least one processor 530 (e.g. by causing the robot system to perform steps in the task plan, simulating execution of the task plan, or running a verification tool such as a reasoning engine, as discussed earlier). Executing the task plan to completion as in act 320 comprises the at least one processor 530 executing instructions which cause robot body 501 to perform actions specified in the task plan. Generating NL descriptions such as in acts 330 and 332 is performed by the at least one processor 530. Providing the second NL query in this example refers to the robot body 501 transmitting the second NL query to the separate device via transceivers 550 and 581 (communication interface). The at least one processor 582 then executes the LLM module with the second NL query as input. Further, receiving the resolution plan from the LLM module as in act 336 of method 300 can comprise the robot body 501 receiving the resolution plan output by the LLM module, transmitted from separate device 580 by transceivers 550 and 581, to be received by the robot controller (or the at least one processor 530). Executing the updated task plan as in act 338 comprises the at least one processor 530 executing instructions which cause robot body 501 to perform actions specified in the updated task plan, or the at least one processor 530 updating the task plan based on the resolution plan then executing the updated task plan.

In other cases, receiving the task plan from the NL as in act 308 of method 300 comprises the at least one processor 582 of the separate device 580 receiving the task plan output by the LLM module. Determining whether the task plan includes at least one fault as in act 310 is performed by the at least one processor 582 (e.g. by simulating execution of the task plan, or running a verification tool such as a reasoning engine, as discussed earlier). If there are no faults in the task plan, the task plan is sent from separate device 580 to robot body 501 via transceivers 550 and 581 (communication interface). In such a scenario, executing the task plan to completion as in act 320 comprises the at least one processor 530 executing instructions which cause robot body 501 to perform actions specified in the task plan. On the other hand, if there is at least one fault in the task plan, the at least one processor 582 generates NL descriptions such as in acts 330 and 332. Providing the second NL query to the LLM module in this scenario refers to the at least one processor 582 executing the LLM module with the second NL query as input. Further, receiving the resolution plan from the LLM module as in act 336 of method 300 can comprise the robot body 501 receiving the resolution plan output by the LLM module, transmitted from separate device 580 by transceivers 550 and 581, to be received by the robot controller (or the at least one processor 530). Executing the updated task plan as in act 338 comprises the at least one processor 530 executing instructions which cause robot body 501 to perform actions specified in the updated task plan or the at least one processor 530 updating the task plan based on the resolution plan then executing the updated task plan.

Alternatively, receiving the resolution plan from the LLM module as in act 336 of method 300 can comprise the at least one processor 582 receiving the resolution plan output by the LLM module. The at least one processor 582 can then generate an updated task plan based on the resolution plan, which is transmitted from separate device 580 by transceivers 550 and 581, to be received by the robot controller (or the at least one processor 530). Executing the updated task plan as in act 338 comprises the at least one processor 530 executing instructions which cause robot body 501 to perform actions specified in the updated task plan.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, methods, control modules and computer program products. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

What is claimed is:

1. A method of operation of a robot system, the method comprising:
   accessing a task plan by at least one processor of the robot system, the task plan expressed in a natural language (NL) and including a plurality of steps;
   determining, by the at least one processor, that the task plan includes at least one fault;
   generating, by the at least one processor, an NL description of the at least one fault;
   providing a NL query to a large language model (LLM) module, the NL query including at least the NL description of the at least one fault and an NL request for a resolution plan;
   receiving the resolution plan from the LLM module, the resolution plan expressed in NL; and
   executing an updated task plan by the robot system, the updated task plan based at least in part on the resolution plan.

2. The method of claim 1, wherein:
   the method further includes generating an NL description of any steps of the task plan which do not include faults; and
   the NL query further includes the NL description of any steps of the task plan which do not include faults.

3. The method of claim 1, wherein the resolution plan includes an NL description of at least one resolution selected from a group of resolutions consisting of:
   adjustment to order of steps in the task plan;
   adjustment to success criteria for any step in the task plan;
   adjustment to any actions expressed in any step of the task plan;

adjustment to any targets of interaction for any step of the task plan;
replacement of any step of the task plan with at least one new step;
removal of at least one step of the task plan; and
the updated task plan to replace all steps of the task plan.

4. The method of claim 1, wherein determining that the task plan includes at least one fault comprises:
executing at least one step of the task plan; and
identifying that execution of the at least one step produces at least one fault scenario.

5. The method of claim 4, wherein each respective fault scenario includes at least one scenario selected from a group of scenarios consisting of:
execution of the step produces results which are not in alignment with the work objective;
execution of the step inhibits execution of at least one other step in the task plan; and
execution of the step produces at least one unacceptable effect in the environment.

6. The method of claim 1, wherein determining that the task plan includes at least one fault comprises: determining that the task plan violates any rule in a set of rules specified in at least part of a reasoning engine.

7. The method of claim 1, wherein determining that the task plan includes at least one fault comprises:
generating a simulation in which a simulated instance of the robot system executes a simulated instance of the task plan; and
identifying at least one fault scenario in the simulation.

8. The method of claim 7, wherein the at least one fault scenario includes at least one scenario selected from a group of scenarios consisting of:
simulated execution of the task plan produces simulated results which are not in alignment with the work objective;
simulated execution of at least one step in the task plan inhibits execution of at least one other step in the task plan; and
simulated execution of the task plan produces at least one unacceptable effect in the environment model.

9. The method of claim 1, further comprising generating the task plan by the LLM module.

10. A robot control module comprising at least one non-transitory processor-readable storage medium storing processor-executable instructions or data that, when executed by at least one processor of a processor-based system, cause the processor-based system to:
access a task plan, the task plan expressed in a natural language (NL) and including a plurality of steps;
determine, by the at least one processor, that the task plan includes at least one fault;
generate, by the at least one processor, an NL description of the at least one fault;
provide a NL query to a large language model (LLM) module, the NL query including at least the NL description of the at least one fault and an NL request for a resolution plan;
receive the resolution plan from the LLM module, the resolution plan expressed in NL; and
execute an updated task plan by the processor-based system, the updated task plan based at least in part on the resolution plan.

11. The robot control module of claim 10, wherein:
the processor-executable instructions or data further cause the at least one processor to generate an NL description of any steps of the task plan which do not include faults; and
the NL query further includes the NL description of any steps of the task plan which do not include faults.

12. The robot control module of claim 10, wherein the resolution plan includes an NL description of at least one resolution selected from a group of resolutions consisting of:
adjustment to order of steps in the task plan;
adjustment to success criteria for any steps in the task plan;
adjustment to any actions expressed in any steps of the task plan;
adjustment to any targets of interaction for any steps of the task plan;
replacement of any steps of the task plan with at least one new step;
removal of at least one step of the task plan; and
the updated task plan to replace all steps of the task plan.

13. The robot control module of claim 10, wherein the processor-executable instructions or data which cause the at least one processor to determine that the task plan includes at least one fault cause the processor-based system to:
execute at least one step of the task plan; and
identify, by the at least one processor that execution of the at least one step produces at least one fault scenario.

14. The robot control module of claim 13, wherein each respective fault scenario includes at least one scenario selected from a group of scenarios consisting of:
execution of the step produces results which are not in alignment with the work objective;
execution of the step inhibits execution of at least one other step in the task plan; and
execution of the step produces at least one unacceptable effect in the environment.

15. The robot control module of claim 10, wherein the processor-executable instructions or data which cause the at least one processor to determine that the task plan includes at least one fault cause the at least one processor to: determine that the task plan violates any rule in a set of rules specified in at least part of a reasoning engine.

16. The robot control module of claim 10, wherein the processor-executable instructions or data which cause the at least one processor to determine that the task plan includes at least one fault cause the at least one processor to:
generate a simulation in which a simulated instance of the processor-based system executes a simulated instance of the task plan; and
identify at least one fault scenario in the simulation.

17. The robot control module of claim 16, wherein the at least one fault scenario includes at least one scenario selected from a group of scenarios consisting of:
simulated execution of the task plan produces simulated results which are not in alignment with the work objective;
simulated execution of at least one step in the task plan inhibits execution of at least one other step in the task plan; and
simulated execution of the task plan produces at least one unacceptable effect in the environment model.

18. The robot control module of claim 10 wherein the processor-executable instructions or data, when executed by at least one processor of the processor-based system, further cause the processor-based system to engage the LLM module to generate the task plan.

19. A robot system comprising:
a robot body;
at least one sensor;
a robot controller including at least one processor and at least one non-transitory processor-readable storage medium, the at least one non-transitory processor-readable storage medium storing processor-executable instructions which when executed by the at least one processor cause the robot system to:
- access a task plan, the task plan expressed in a natural language (NL) and including a plurality of steps;
- determine, by the at least one processor, that the task plan includes at least one fault;
- generate, by the at least one processor, an NL description of the at least one fault;
- provide a NL query to a large language model (LLM) module, the NL query including at least the NL description of the at least one fault and an NL request for a resolution plan;
- receive the resolution plan from the LLM module, the resolution plan expressed in NL; and
- execute an updated task plan by the robot system, the updated task plan based at least in part on the resolution plan.

20. The robot system of claim 19 wherein the at least one non-transitory processor-readable storage medium of the robot system stores the LLM module.

* * * * *